US011267574B2

(12) United States Patent
Benson et al.

(10) Patent No.: US 11,267,574 B2
(45) Date of Patent: Mar. 8, 2022

(54) AIRCRAFT WITH ELECTRIC MOTOR AND RECHARGEABLE POWER SOURCE

(71) Applicant: The Boeing Company, Chicago, IL (US)

(72) Inventors: Christopher Pete Benson, Berkeley, CA (US); Leonard J. Quadracci, Seattle, WA (US); Douglas C. Cameron, Ladera Ranch, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/064,366

(22) Filed: Oct. 28, 2013

(65) Prior Publication Data

US 2015/0115108 A1    Apr. 30, 2015

(51) Int. Cl.
*B60L 58/12*         (2019.01)
*B64D 27/24*        (2006.01)
(Continued)

(52) U.S. Cl.
CPC ............. *B64D 27/24* (2013.01); *B60L 53/00* (2019.02); *B64C 39/024* (2013.01); *B64D 41/00* (2013.01);
(Continued)

(58) Field of Classification Search
CPC .. B64D 27/24; B64D 2027/026; B64D 31/00; B64D 31/06; B64C 2201/042; B64C 2201/066; B60L 11/18; B60L 11/00
(Continued)

(56) References Cited

U.S. PATENT DOCUMENTS 2,179,105 A * 11/1939 Watson ................. B23K 11/26
                                                                219/113
4,368,411 A     1/1983 Kidd
(Continued)

FOREIGN PATENT DOCUMENTS

CN      103151815 A     6/2013
EP       0596472 A2     5/1994
(Continued)

OTHER PUBLICATIONS

Thomas et al.; Energy scavenging for small-scale unmanned systems; 2006; Elsevier; Journal of Power Sources 159; pp. 1494-1509.*

(Continued)

*Primary Examiner* — Richard R. Green
*Assistant Examiner* — Michael A. Fabula
(74) *Attorney, Agent, or Firm* — Yee & Associates, P.C.

(57) ABSTRACT

A method and apparatus for controlling an electric aircraft. An apparatus comprises a motor, a power source, and a four-quadrant controller. The motor operates in four quadrants of operational space and operates in one of an accelerating state and a regenerative braking state. A total current flows through the motor. The power source is connected to the motor, and when the motor operates in the regenerative braking state, the total current flows through the power source. The power source has a maximum allowable current. The four-quadrant controller is programmed to identify a recharging parameter, brake the motor to initiate the regenerative braking state when the recharging parameter is present, recharge the power source with the total current during the regenerative braking state, and control a duty cycle of the motor such that the total current does not exceed the maximum allowable current during the regenerative braking state.

20 Claims, 18 Drawing Sheets

(51) Int. Cl.
*B64D 41/00* (2006.01)
*B64C 39/02* (2006.01)
*B60L 53/00* (2019.01)

(52) U.S. Cl.
CPC .. *B64C 2201/042* (2013.01); *B64C 2201/066* (2013.01); *Y02T 50/40* (2013.01); *Y02T 50/50* (2013.01); *Y02T 50/60* (2013.01)

(58) Field of Classification Search
USPC .......................... 191/2, 3, 22 R, 28; 320/104
See application file for complete search history.

(56) References Cited

U.S. PATENT DOCUMENTS

| | | | | |
|---|---|---|---|---|
| 4,494,051 | A * | 1/1985 | Bailey | H02P 6/06 318/400.04 |
| 4,528,486 | A | 7/1985 | Flaig et al. | |
| 4,937,725 | A * | 6/1990 | Dhyanchand | H02M 1/34 363/132 |
| 5,254,935 | A * | 10/1993 | Vercesi | H02J 7/1446 320/104 |
| 5,585,708 | A * | 12/1996 | Richardson | H02M 5/4585 318/722 |
| 6,742,741 | B1 * | 6/2004 | Rivoli | B64C 3/40 244/12.1 |
| 7,245,108 | B2 * | 7/2007 | Chertok | B60L 11/185 320/132 |
| 7,653,464 | B1 * | 1/2010 | Mitra | B60K 6/105 342/357.31 |
| 8,441,228 | B2 * | 5/2013 | Brabec | B60L 11/1861 180/65.21 |
| 8,511,606 | B1 | 8/2013 | Lutke et al. | |
| 8,884,562 | B1 * | 11/2014 | Cameron, Jr. | H02P 6/10 318/400.29 |
| 9,045,234 | B2 * | 6/2015 | Frolov | B64D 33/00 |
| 2002/0146617 | A1 | 10/2002 | Johnson et al. | |
| 2003/0210004 | A1 * | 11/2003 | Zacher | F02D 11/106 318/400.01 |
| 2004/0144579 | A1 | 7/2004 | Hasuka et al. | |
| 2004/0263099 | A1 * | 12/2004 | Maslov | B60L 11/126 318/400.24 |
| 2005/0007043 | A1 * | 1/2005 | Kim | H02K 3/28 318/400.28 |
| 2005/0052080 | A1 * | 3/2005 | Maslov | B60L 8/00 307/10.1 |
| 2005/0179463 | A1 | 8/2005 | Kasuya et al. | |
| 2008/0275644 | A1 | 11/2008 | Macneille et al. | |
| 2010/0064689 | A1 * | 3/2010 | Reinhardt | B64D 27/24 60/706 |
| 2010/0230547 | A1 * | 9/2010 | Tayman | B64C 27/24 244/7 C |
| 2011/0025124 | A1 * | 2/2011 | Brabec | B60L 11/1861 307/9.1 |
| 2012/0298790 | A1 * | 11/2012 | Bitar | B64C 27/12 244/17.11 |
| 2013/0134264 | A1 * | 5/2013 | Carter, Jr. | B64C 27/025 244/7 A |
| 2014/0129056 | A1 * | 5/2014 | Criado | G05D 1/105 701/4 |
| 2014/0239712 | A1 * | 8/2014 | Yoon | B60L 11/1803 307/10.1 |
| 2014/0306628 | A1 * | 10/2014 | Benson | H02P 29/02 318/400.17 |
| 2014/0306663 | A1 * | 10/2014 | Ngo | B60L 11/1803 320/128 |
| 2014/0333233 | A1 * | 11/2014 | Zeng | G08C 23/04 318/16 |
| 2014/0354199 | A1 * | 12/2014 | Zeng | H02P 21/0085 318/400.3 |
| 2015/0008849 | A1 * | 1/2015 | Benson | H02P 6/00 318/139 |
| 2015/0008854 | A1 * | 1/2015 | Cameron | H02P 6/003 318/400.09 |
| 2015/0028594 | A1 * | 1/2015 | Mariotto | H02K 7/006 290/52 |
| 2015/0084558 | A1 * | 3/2015 | Benson | H02P 6/182 318/400.13 |
| 2015/0084561 | A1 * | 3/2015 | Benson | H02P 6/04 318/400.23 |
| 2015/0097071 | A1 * | 4/2015 | Frolov | B64D 41/007 244/13 |
| 2015/0136897 | A1 * | 5/2015 | Seibel | B64C 29/0033 244/6 |

FOREIGN PATENT DOCUMENTS

| | | | | |
|---|---|---|---|---|
| EP | 2629166 | A1 * | 8/2013 | ............. G05D 1/105 |
| KR | 20000009709 | A | 2/2000 | |
| KR | 20090114910 | A | 11/2009 | |
| KR | 20130109986 | A | 10/2013 | |
| WO | WO2011149544 | A1 | 12/2011 | |
| WO | WO2014165502 | A1 | 10/2014 | |

OTHER PUBLICATIONS

Qidwai et al.; Energy harvesting concepts for small electric unmanned systems; 2004; Smart Structures and Materials 2004: Active Materials: Behavior and Mechanics; vol. 5387.*

Cameron Jr., "Current Control in Brushless DC Motors," U.S. Appl. No. 13/303,673, filed Nov. 23, 2011, 43 pages.

Cameron, "Quadrant Change Control in Brushless DC Motors," U.S. Appl. No. 13/933,803, filed Jul. 2, 2013, 82 pages.

Zeng et al., "Active Voltage Controller for An Electric Motor," U.S. Appl. No. 13/905,392, filed May 30, 2013, 47 pages.

"SPEED Software," CD-Adapco, 4 pp., accessed Nov. 15, 2011, http://www.speedlab.co.uk/software.html.

"TG100H BLDC Inductor Board," ThinGap Corporation, 1 page, accessed Nov. 15, 2011, http://www.thingap.com/pdf/2011/tg100hbldcindboard.pdf.

International Search Report and Written Opinion, dated Jul. 22, 2014, regarding Application No. PCT/US2014/033532, 15 pages.

Partial International Search Report, dated Oct. 9, 2014, regarding Application No. PCT/US2014/045045, 7 pages.

Jojo, "SCR Applications," Electronic Circuits and Diagram—Electronics Projects and Design. Sep. 15, 2009, 6 pages, http://www.circuitstoday.com/scr-applications.

International Search Report and Written Opinion, dated Jan. 14, 2015, regarding Application No. PCT/US2014/045048, 20 pages.

Extended European Search Report, dated Mar. 20, 2015, regarding Application No. 14190508.3, 8 pages.

Final Office Action, dated May 6, 2016, regarding U.S. Appl. No. 14/506,619, 17 pages.

Canadian Intellectual Property Office Examination Search Report, dated Nov. 26, 2015, regarding Application No. 2,865,632, 4 pages.

Canadian Intellectual Property Office Office Action, dated Sep. 29, 2016, regarding Application No. 2,865,632, 3 pages.

European Examination Report, dated Feb. 21, 2017, regarding Application No. 14190508.3, 5 pages.

Canadian Intellectual Property Office Office Action, dated Sep. 19, 2017, regarding Application No. 2,865,632, 6 pages.

Canadian Intellectual Property Office, Office Action and Examination Report, dated Jul. 16, 2018, regarding Application No. 2,865,632, 9 pages.

State Intellectual Property Office of China, Second Notification of Office Action and English translation, dated Jul. 16, 2018, regarding Application No. 201410584605.X, 8 pages.

Brazilian Office Action with English Translation, dated Mar. 13, 2020, regarding Application No. BR102014024914-1 , 6 pages.

Chinese Fourth Notification of Office Action with English translation, dated Nov. 3, 2020, regarding Application No. 201410584605.X, 10 pages.

Korean Office Action and English translation, dated Dec. 23, 2020, regarding Application No. 10-2014-0147718, 10 pages.

Korean Office Action and English translation, dated Jun. 17, 2021, regarding Application No. 10-2014-0147718, 10 pages.

(56) References Cited

OTHER PUBLICATIONS

Chinese First Notification of Office Action and English translation, dated Dec. 4, 2017, regarding Application No. 201410584605, 13 pages.

* cited by examiner

900 — $i_{nfb} \div DC_{nfb} = \dfrac{i_n}{100\% \, DC}$

902 — $\dfrac{i_{n1}}{100\% \, DC} + \dfrac{i_{n2}}{100\% \, DC} + \circ\circ\circ = \dfrac{i_{tot}}{100\% \, DC}$ 904 — $\dfrac{i_n}{i_{tot}} \times i_{cmd,tot} = i_{ncmd}$

FIG. 9

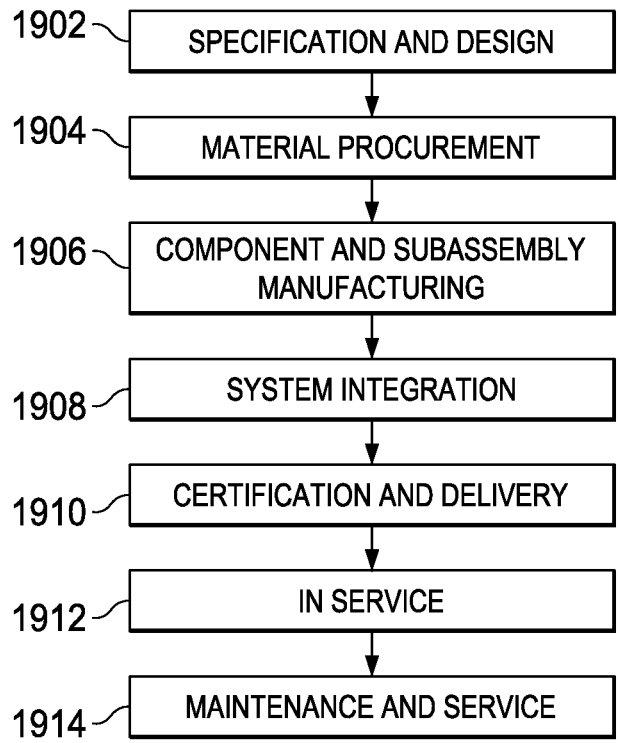
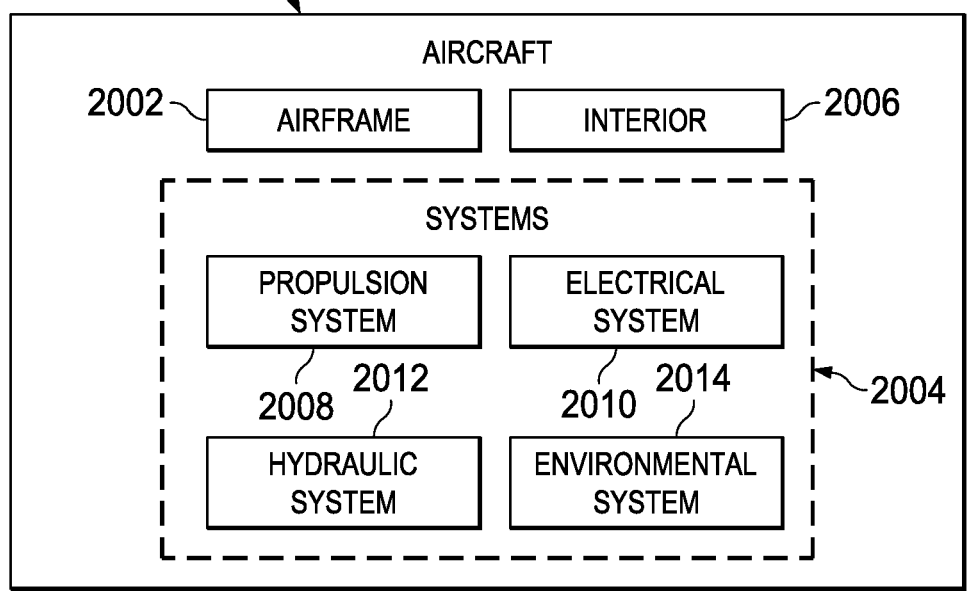

AIRCRAFT WITH ELECTRIC MOTOR AND RECHARGEABLE POWER SOURCE

BACKGROUND INFORMATION

1. Field

The present disclosure relates generally to aircraft and, in particular, to aircraft with electric motors. Still more particularly, the present disclosure relates to a method and apparatus for an aircraft electric motor system.

2. Background

An electric motor is a device that converts electrical power into mechanical power. Electric motors are used for various applications. These applications include fans, pumps, tools, disc drives, drills, and other types of devices that may be found in different types of platforms.

An example of a platform in which an electric motor may be used is an aircraft. In some cases, the electric motor may be part of a propulsion system for the aircraft. For example, the electric motor may turn one or more propellers for the aircraft to provide movement of the aircraft on the ground, through the air, or a combination thereof.

An aircraft that uses the electric motor may take various forms. For example, the aircraft may be an airplane, a rotorcraft, a helicopter, a quadcopter, an unmanned aerial vehicle, or some other suitable type of aircraft.

When electric motors are used for propulsion of the aircraft, electrical energy may be supplied by a power source. For instance, electrical energy may be supplied using a battery system. The load on the battery system or other power source is an important consideration for the design and manufacturing of the aircraft. For example, the amount of electrical energy used by the electric motor to move the aircraft during various stages of flight may be important.

Electric motors that use battery systems may require the battery to be recharged after a specified amount of time, distance, electrical energy use, or a combination thereof. If the electric motor uses more electrical energy than desired for a desired level of performance, then the time, distance, or time and distance between recharging and maintenance may be shorter than desired. Therefore, it would be desirable to have a method and apparatus that take into account at least some of the issues discussed above, as well as other possible issues.

SUMMARY

In one illustrative embodiment, an apparatus comprises a controller. The controller is configured to identify a state for an electric aircraft. The controller is further configured to identify a group of recharging parameters for a group of electric motors in an electric propulsion system. The electric propulsion system is configured to move the electric aircraft based on the state for the group of electric motors for the electric aircraft. The controller is still further configured to recharge a power source for the electric aircraft using the group of recharging parameters to control recharging of the power source with the group of electric motors when a recharge state is present for the electric aircraft.

In another illustrative embodiment, an electric aircraft comprises an airframe, a group of propellers, a group of electric motors physically associated with the airframe, a power source, and a controller. The group of electric motors is configured to turn the group of propellers and move the airframe. The power source is connected to the group of electric motors such that a current flows between the power source and the group of electric motors. The controller is configured to identify a state for the group of electric motors. The controller is further configured to identify a group of recharging parameters for the group of electric motors when the state is a recharge state present for the electric aircraft. The controller is still further configured to recharge the power source using the group of recharging parameters to control recharging of the power source with the group of electric motors when the recharge state is present for the electric aircraft.

In yet another illustrative embodiment, a method for controlling an electric aircraft is provided. A state for the electric aircraft is identified. A group of recharging parameters is identified for a group of electric motors when the state is a recharge state and is present for the electric aircraft. The group of electric motors is configured to move the electric aircraft. A power source for the electric aircraft is recharged using the group of recharging parameters to control recharging of the power source with the group of electric motors when the recharge state is present for the electric aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of equations for calculating a commanded current in accordance with an illustrative embodiment;

FIG. 19 is an illustration of a block diagram of an aircraft manufacturing and service method in accordance with an illustrative embodiment; and FIG. 20 is an illustration of a block diagram of an aircraft in accordance with an illustrative embodiment.

DETAILED DESCRIPTION

The illustrative embodiments recognize and take into account one or more different considerations. For example, the illustrative embodiments recognize and take into account that the time, distance, or both time and distance that an aircraft may fly using an electric motor may be increased in a number different ways. For instance, when the electric motor uses a battery system as a power source, that battery system may be recharged. The illustrative embodiments further recognize and take into account that this recharging of the battery system may occur while the aircraft is away from a designated recharging location for the aircraft.

Illustrative embodiments recognize and take into account that electric motors for aircraft may include an energy-harvesting device. The energy-harvesting device may generate electrical energy to recharge the battery system while the aircraft is away from a designated recharging location for the aircraft. In this illustrative example, the energy-harvesting device may take various forms. For instance, the energy-harvesting device may be selected from one of a solar cell, a thermoelectric generator, a piezoelectric crystal, an antenna, and other suitable types of devices configured to recharge the battery system of the aircraft.

The illustrative embodiments further recognize and take into account that the addition of an energy-harvesting device as a separate component in the aircraft may add more weight and complexity than desired in some cases. The illustrative embodiments further recognize and take into account that an electric motor used for propulsion of an aircraft may also be used as an energy-harvesting device. In particular, the electric motor in conjunction with a propeller may be used to harvest wind energy available in the form of kinetic energy to generate a current that may be used to recharge a battery system in the aircraft. The illustrative embodiments recognize and take into account, however, that some currently used propulsion systems may not have the capability to provide both movement and recharging for the aircraft.

Thus, the illustrative embodiments provide a method and apparatus for recharging a power source. In one illustrative example, an apparatus comprises a controller. The controller is configured to identify a state for an aircraft and identify a group of recharging parameters for a number of electric motors. The number of electric motors is configured to move the aircraft through the air when an operating state is present for the aircraft. The controller is further configured to recharge a power source for the aircraft using the group of parameters and control recharging of the power source with the group of electric motors when the recharge state is present for the aircraft.

Figure 1:
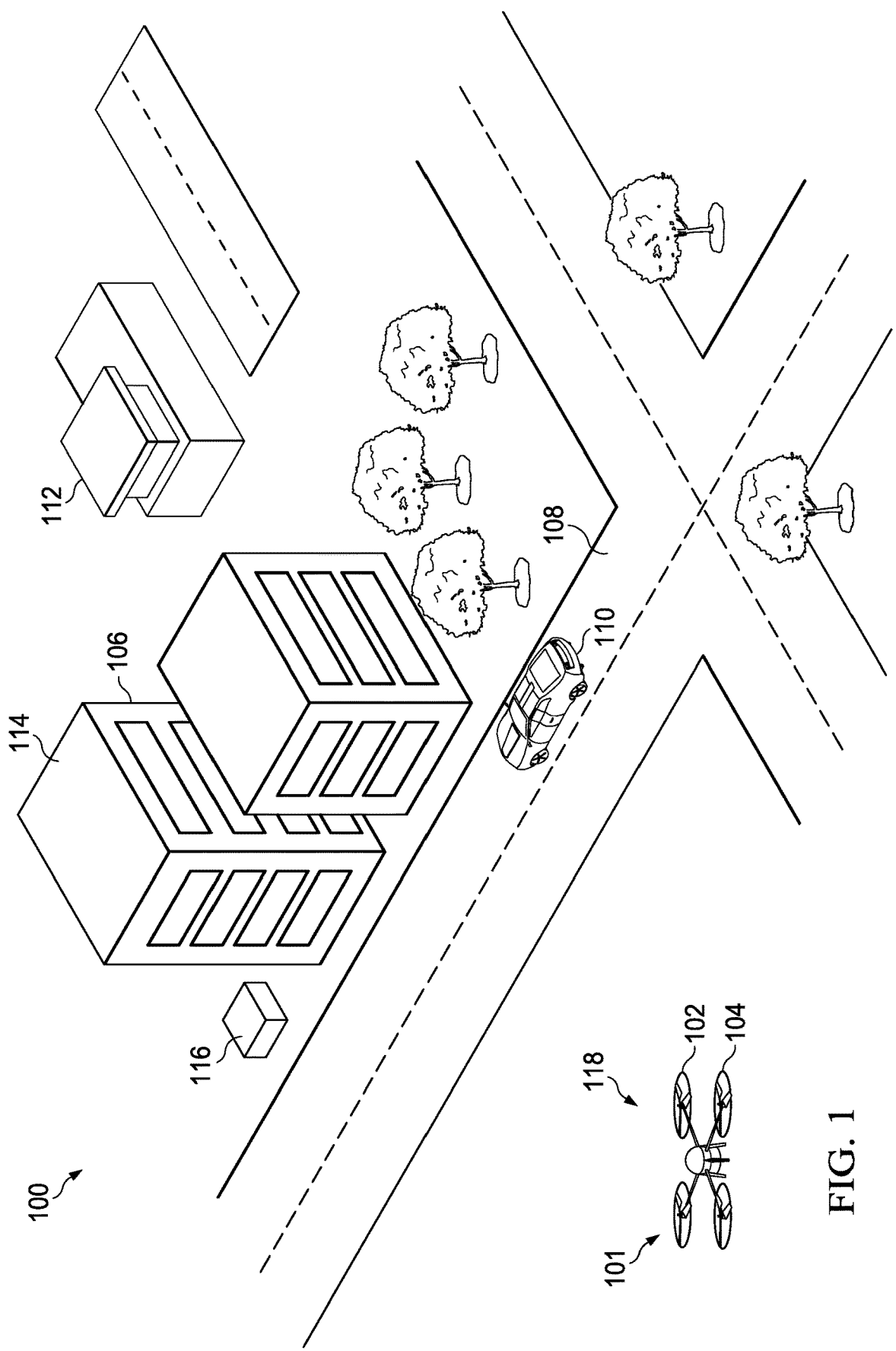
FIG. 1 is an illustration of an electric aircraft environment in accordance with an illustrative embodiment.

With reference now to the figures and, in particular, with reference to FIG. 1, an illustration of an electric aircraft environment is depicted in accordance with an illustrative embodiment. In this illustrative example, electric aircraft environment 100 is an example of an environment in which electric aircraft 101 may operate.

In this illustrative example, electric aircraft 101 takes the form of quadcopter 102. Quadcopter 102 is a type of aircraft that is lifted and propelled by four sets of propellers in this illustrative example. In this illustrative example, a "set" includes one or more components. Accordingly, a set of propellers includes one or more propellers.

As depicted, quadcopter 102 flies using electric propulsion system 104 and performs different operations in electric aircraft environment 100. For example, quadcopter 102 may perform operations for a surveillance mission. The operations for the surveillance mission may include generating images of objects including building 106. These images may be still images, video, or some combination thereof.

Additionally, the surveillance mission also may include generating images of traffic on road 108. For example, quadcopter 102 may generate images of vehicle 110 moving on road 108.

In these illustrative examples, quadcopter 102 is configured to fly for a selected period of time. The time of flight for quadcopter 102 is based on the capacity of the power source in quadcopter 102 and its required performance level. In this illustrative example, the performance level may include the level of energy needed to perform a mission as desired. As a result, quadcopter 102 may return to recharging location 112 after some period of time to recharge the power source for quadcopter 102. For instance, quadcopter 102 may return to recharging location 112 to recharge a battery system for quadcopter 102.

In some cases, it may be desirable to extend the mission time for quadcopter 102. In other words, it may be desirable to use an amount of energy that allows quadcopter 102 to fly for a longer period of time, generate more information about electric aircraft environment 100, perform additional operations, or some combination thereof.

The mission time for quadcopter 102 may be extended in a number of different ways. For example, quadcopter 102 may rest on a structure in electric aircraft environment 100 for a period of time while performing the mission.

In one illustrative example, quadcopter 102 may use roof 114 as a vantage point, using less power to perform a portion of a mission while on roof 114. For instance, roof 114 may be a location from which quadcopter 102 may generate images of vehicle 110 moving on road 108 without flying along road 108. In this manner, quadcopter 102 may save battery life and extend mission time.

In another illustrative example, quadcopter 102 may extend mission time by using an energy-harvesting system to recharge the power source. In particular, quadcopter 102 may employ an energy-harvesting system that has dual use. In other words, the energy-harvesting system may perform another function in addition to recharging the power source.

As depicted in this example, electric propulsion system 104 may also function as an energy-harvesting system to recharge the power source of quadcopter 102. The energy-harvesting system for quadcopter 102 may be activated in a number of different ways. For instance, quadcopter 102 may land on air conditioning unit 116.

As illustrated, air flowing from air conditioning unit 116 may turn propellers 118 to generate electrical energy that may be used to recharge the power source in quadcopter 102. In this manner, electric propulsion system 104 may have a dual purpose as an energy-harvesting system and therefore, a separate energy-harvesting system may not be needed in quadcopter 102. As a result, at least one of weight, complexity, or other factors may be reduced for quadcopter 102 in these illustrative examples.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

In other illustrative examples, quadcopter 102 may land on another structure with a suitable amount of wind in the environment around the structure. For instance, quadcopter 102 may land on roof 114 such that its propellers face in the direction of the relative wind vector. This wind may then be used to recharge the power source of quadcopter 102.

The illustration of electric aircraft environment 100 in FIG. 1 is only meant as an example of an implementation for an illustrative embodiment. In other illustrative examples, one or more electric aircraft may be used in addition to or in place of quadcopter 102.

In other examples, missions may be performed in other locations other than the location of building 106. For example, missions may be performed to survey a pipeline, obtain information about a forest fire, and other suitable types of missions.

Figure 2:
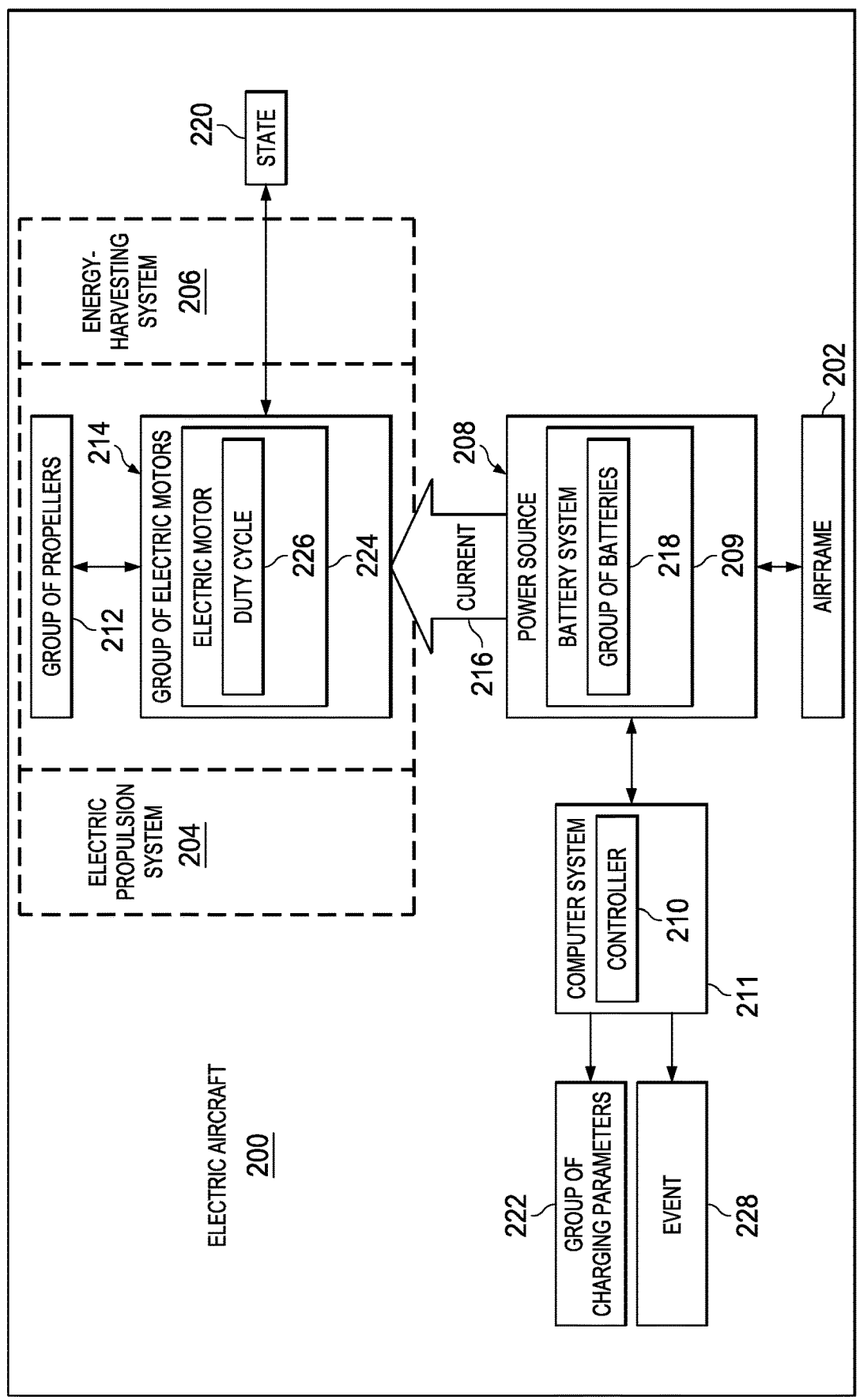
FIG. 2 is an illustration of a block diagram of an electric aircraft in accordance with an illustrative embodiment.

With reference now to FIG. 2, a block diagram of an electric aircraft is depicted in accordance with an illustrative embodiment. Quadcopter 102 in FIG. 1 is an example of one physical implementation of electric aircraft 200 shown in block form in FIG. 2.

In this illustrative example, electric aircraft 200 includes a number of components. As depicted, electric aircraft 200 includes airframe 202, electric propulsion system 204, energy-harvesting system 206, power source 208, and controller 210. Electric aircraft 200 may have other components in addition to or in place of the ones depicted in the different illustrative examples.

As illustrated, airframe 202 is the mechanical structure for electric aircraft 200. Airframe 202 may be selected from at least one of a frame, a fuselage, or some other physical structure that may be associated with other components within electric aircraft 200.

When one component is "associated" with another component, the association is a physical association in the depicted examples. For example, a first component may be considered to be physically associated with a second component by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

As depicted, electric propulsion system 204 includes group of propellers 212 and group of electric motors 214. As used here, a "group of" when used with reference to items means one or more items. For example, group of propellers 212 is one or more propellers.

In this illustrative example, group of propellers 212 are physically associated with group of electric motors 214. Group of electric motors 214 is physically associated with airframe 202.

Group of electric motors 214 is configured to turn group of propellers 212 and move airframe 202 for electric aircraft 200. The movement of electric aircraft 200 by electric propulsion system 204 may be on the ground, in the air, or a combination thereof.

In this illustrative example, energy-harvesting system 206 also includes group of propellers 212 and group of electric motors 214. In other words, group of propellers 212 and group of electric motors 214 may function as either electric propulsion system 204 or energy-harvesting system 206 in this illustrative example.

As depicted, power source 208 is connected to group of electric motors 214 such that current 216 flows between power source 208 and group of electric motors 214. In this illustrative example, power source 208 is battery system 209. In other illustrative examples, power source 208 may be selected from one of a fuel cell and other suitable types of rechargeable power sources.

Battery system 209 is comprised of group of batteries 218 and other suitable components configured to operate battery system 209. For instance, in some illustrative examples, battery system 209 may comprise a battery balancer circuit configured to monitor the charge state of one or more batteries in battery system 209. In other illustrative examples, this battery balancer circuit may be absent from battery system 209.

In this depicted example, current 216 flows from power source 208 to group of electric motors 214 when group of propellers 212 and group of electric motors 214 function as electric propulsion system 204. Current 216 flows from group of electric motors 214 to power source 208 when group of propellers 212 and group of electric motors 214 function as energy-harvesting system 206 to recharge power source 208.

In this illustrative example, the recharging of power source 208 may take the form of parasitic recharging. Current 216 may be a regenerative current when current 216 flows from group of electric motors 214 to power source 208.

In this illustrative example, a parasitic recharge refers to the process of extracting energy from a non-conventional power source. In other words, parasitic recharge comes from a source whose primary function is not to provide power. For instance, when energy-harvesting system 206 uses the mechanical energy in the wind coming out of the exhaust of an air conditioning unit to charge power source 208, the process may be referred to as parasitic recharge.

In this illustrative example, controller 210 is configured to control operation of electric aircraft 200. As depicted, controller 210 may be implemented in software, hardware, firmware, or a combination thereof. When software is used, the operations performed by controller 210 may be implemented in a program code configured to run on a processor unit. When firmware is used, the operations performed by controller 210 may be implemented in the program code and data and stored in persistent memory to run on a processor unit. When hardware is employed, the hardware may include circuits that operate to perform the operations in controller 210.

In illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, controller 210 may be an impulse width modulation controller (IWMC). In this depicted example, an impulse width modulation controller controls the current in the windings of a direct current (DC) motor using impulse width modulation (IWM). Impulse width modulation is a digital algorithmic method that provides four quadrant control of current within the motor windings with an "H" bridge switching configuration. This "H" bridge also may be referred to as a power inverter in these illustrative examples.

During each duty cycle, feedback determines the appropriate time for one switch bridge switch to be on or off in order to provide a desired positive or negative change of current. By varying the duty cycle, the magnitude of current 216 is affected to drive current 216 closer to a desired level. In other illustrative examples, other types of controllers may be used for controller 210, depending on the particular implementation.

In this depicted example, controller 210 is configured to identify state 220 for group of electric motors 214. State 220 may be an operational state in these illustrative examples. For instance, state 220 may be selected from one of operating group of electric motors 214, recharging group of electric motors 214, standby, or some other suitable state.

Controller 210 is also configured to identify group of recharging parameters 222 for group of electric motors 214 in electric propulsion system 204 based on state 220. As depicted, controller 210 is configured to recharge power source 208 using group of recharging parameters 222 to control recharging of power source 208 with group of electric motors 214 based on state 220 for electric aircraft 200.

In this illustrative example, group of recharging parameters 222 may take various forms. For example, group of recharging parameters 222 may be selected from at least one of a total current to power source 208, a current from electric motor 224 in group of electric motors 214, a voltage for electric motor 224, or other suitable parameters.

As depicted, the total current is the sum of a group of currents from group of electric motors 214 used to recharge power source 208. In other words, the total current generated from group of electric motors 214 forms current 216. Each electric motor in group of electric motors 214 may generate a current.

In this illustrative example, the level of current corresponding to each motor in group of electric motors 214 may be the same or different than other electric motors. For instance, a first electric motor may generate a first current, while a second electric motor may generate a second current that is different than the first current.

In other examples, the first current and the second current may be substantially the same. In some illustrative examples, only one motor may be present in group of electric motors 214. In this case, the total current, current 216, is the current generated by electric motor 224.

In some cases, the total current may be selected to be less than or equal to a maximum current of power source 208. This maximum current may be a maximum allowable current. The selection of the maximum allowable total current may change over time based on the charge state of power source 208 or a health state of power source 208. Further, a value for maximum allowable total current may be selected to increase the life of power source 208, reduce maintenance for power source 208, or some combination thereof. A higher current may be selected for total current to charge power source 208 in a shorter time but may reduce the life of power source 208.

As illustrated, when group of recharging parameters 222 comprises a current from electric motor 224 in group of electric motors 214, controller 210 may be configured to control duty cycle 226. In this illustrative example, duty cycle 226 represents the percentage of time a number of switches within electric motor 224 are in the "on" or "closed" state. In other words, duty cycle 226 is the amount of time the number of switches within electric motor 224 are active to provide current to electric motor 224 as a fraction of total time under consideration.

In this illustrative example, controller 210 is configured to identify recharging parameters in group of recharging parameters 222 for group of electric motors 214 in response to event 228 based on state 220 of electric aircraft 200. In the illustrative example, event 228 is selected from at least one of electric aircraft 200 entering the recharging state, an expiration of a period of time, a change in group of electric motors 214, or some other suitable event.

Thus, electric aircraft 200 may recharge itself using energy-harvesting system 206. Energy-harvesting system 206 operates without adding weight or complexity to the design of electric aircraft 200. When power source 208 is rechargeable using energy-harvesting system 206, the size, weight, and cost of power source 208 used for electric aircraft 200 may be reduced.

Further, with the use of energy-harvesting system 206, electric aircraft 200 may operate for a longer period of time as compared to some configurations for an electric aircraft. Electric aircraft 200 also may perform more complex and time-intensive missions without needing to return to a designated recharging station. Controller 210 may be configured to switch from electric propulsion system 204 to energy-harvesting system 206 in the field during a mission to recharge power source 208.

The illustration of electric aircraft 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 210 is shown as being physically associated with airframe 202. In some, illustrative examples, controller 210 may be distributed in more than one location. For example, a portion of controller 210 may be physically associated with airframe 202 while another portion of controller 210 may be in another location such as a ground station, another aircraft, or in some other suitable location. With this example, the different portions of controller 210 may be implemented in computer system 211. Computer system 211 may include one or more computers that communicate with each other over a communications medium such as a wireless communications link.

As another example, electric aircraft 200 may take a different form than illustrated in this figure. Although one example of electric aircraft 200 is described with respect to quadcopter 102 in FIG. 1, electric aircraft 200 may take other forms. For example, electric aircraft 200 may be selected from one of an airplane, a helicopter, a rotorcraft, and unmanned aerial vehicle (UAV), and other suitable types of electric aircraft.

In another illustrative example, controller 210 may be implemented using another type of controller other than an impulse width modulation controller. For example, controller 210 may be implemented as a pulse width modulation (PWM) controller.

In still another illustrative example, the recharging of power source 208 using energy-harvesting system 206 may be performed in addition to or in place of regenerative recharging of power source 208. Regenerative recharging of power source 208 may occur when controller 210 changes the direction of group of propellers 212, slows down the rate at which group of propellers 212 turn, or some combination thereof. In other words, the braking of group of electric motors 214 may be used to regeneratively recharge power source 208.

Figure 3:
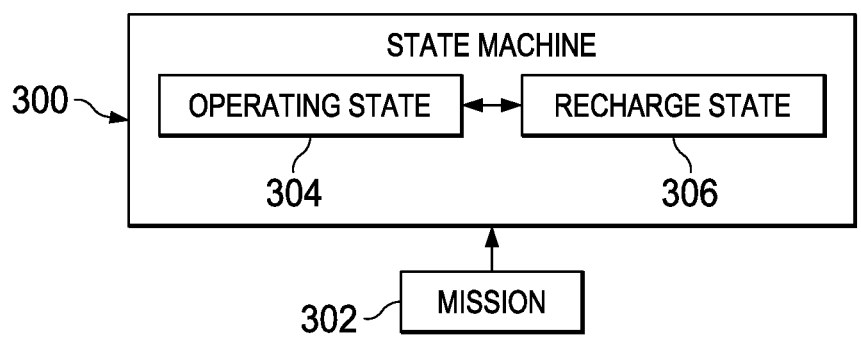
FIG. 3 is an illustration of a block diagram of a state machine for operation of an electric aircraft in accordance with an illustrative embodiment.

Turning next to FIG. 3, an illustration of a block diagram of a state machine for operation of an electric aircraft is depicted in accordance with an illustrative embodiment. In this illustrative example, state machine 300 shows state 220 that electric aircraft 200 in FIG. 2 may enter to perform mission 302. In this illustrative example, state 220 for electric aircraft 200 is selected from one of operating state 304 and recharge state 306.

Electric aircraft 200 starts in operating state 304. In some illustrative examples, operating state 304 may be referred to as a "motoring" state, or a state in which electric propulsion system 204 in FIG. 2 is active. When state 220 for electric aircraft 200 is operating state 304, electric aircraft 200 performs operations for mission 302. These operations may include for example, at least one of flying to a location, generating images of a target at the location, dropping a payload at the location, firing a weapon at a target at the location, returning to home base, or other suitable operations. In operating state 304, group of electric motors 214 in FIG. 2 is used for movement.

Electric aircraft 200 may increase the duration of mission 302 by changing state 220 to recharge state 306. In this state, electric aircraft 200 may recharge power source 208 using energy-harvesting system 206 in FIG. 2.

When in recharge state 306, electric aircraft 200 also may perform operations for mission 302. For example, when on the ground recharging power source 208, electric aircraft 200 may still generate images and perform other operations that may be performed while electric aircraft 200 is not moving.

After recharging power source 208, state machine 300 for electric aircraft 200 may return to operating state 304. In this manner, electric aircraft 200 may continue performing operations for mission 302. In this illustrative example, electric aircraft 200 may move between operating state 304 and recharge state 306 any number of times during the performance of mission 302.

Figure 4:
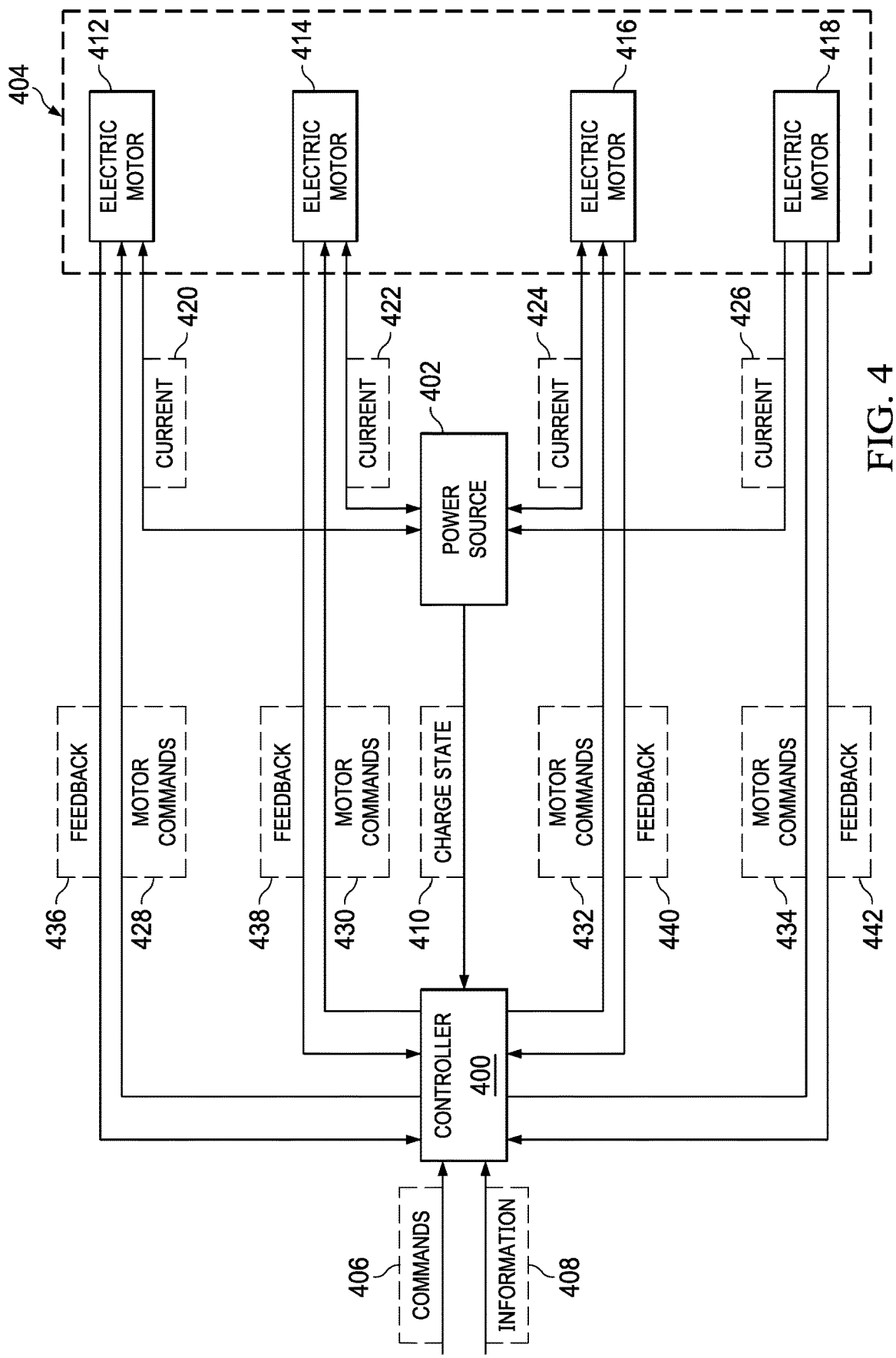
FIG. 4 is an illustration of an information flow diagram for an electric motor system in accordance with an illustrative embodiment.

With reference next to FIG. 4, an illustration of an information flow diagram for an electric motor system is depicted in accordance with an illustrative embodiment. In this illustrative example, controller 400 is associated with power source 402 and group of electric motors 404. Controller 400 is an example of controller 210 in FIG. 2. Group of electric motors 404 is an example of group of electric motors 214 in FIG. 2. Controller 400, power source 402, and group of electric motors 404 are in communication with each other in this illustrative example.

As depicted, controller 400 is a flight computer for an aircraft. Controller 400 is configured to receive commands 406 and information 408.

In this illustrative example, commands 406 may be one of autopilot commands, pilot commands, or some other suitable type of commands. Commands 406 are commands for group of electric motors 404 in this illustrative example. For instance, commands 406 may specify revolutions per minute (RPM) and thrust commands for operation of one or more of group of electric motors 404.

As illustrated, information 408 is information provided by various monitoring systems for the aircraft. Information 408 may take a number of different forms. For instance, information 408 may take the form of airspeed, altitude, orientation, or other suitable information about the aircraft. Information 408 may be used by controller 400 to control operation of group of electric motors 404 in this illustrative example.

Power source 402 is in communication with controller 400 in this depicted example. Power source 402 provides charge state 410 to controller 400 in this illustrative example. Charge state 410 may be the level of charge remaining in power source 402. For instance, when power source 402 is a battery system, charge state 410 may be a battery charge state which represents the remaining charge in the battery system.

In this depicted example, controller 400 uses charge state 410 sent by power source 402 to determine when power source 402 needs recharging. The determination of whether power source 402 needs recharging may be based on a number of recharging parameters. For instance, when the charge remaining in power source 402 reaches a threshold value or the voltage across the battery terminals becomes lower than a specified value, controller 400 may switch the state of group of electric motors 404 from an operating state to a recharge state. In other words, when charge state 410 reaches a selected value, group of electric motors 404 may be placed in a recharge state to recharge power source 402.

Charge state 410 also may include a maximum amount of regenerative current for power source 402. For instance, charge state 410 may identify a maximum allowable value of current to be sent back to power source 402 by group of electric motors 404. In another example, power source 402 and controller 400 may identify the current needed such that power source 402 is recharged to a state sufficient for completion of its mission.

Group of electric motors 404 includes four electric motors in this illustrative example. In particular, group of electric motors 404 includes electric motor 412, electric motor 414, electric motor 416, and electric motor 418 in this illustrative example. Group of electric motors 404 receives currents from power source 402 when in an operating state and sends currents to power source 402 when in a recharge state.

In particular, electric motor 412 receives current 420, electric motor 414 receives current 422, electric motor 416 receives current 424, and electric motor 418 receives current 426 in the operating state. Current 420, current 422, current 424, and current 426 may flow in the opposite direction during the recharge state. In some examples, the current flowing in one direction may be the same or different than the current flowing in the opposite direction, depending on the particular implementation.

In this depicted example, controller 400 sends a number of motor commands to group of electric motors 404. For instance, controller 400 sends motor commands 428 to electric motor 412, motor commands 430 to electric motor 414, motor commands 432 to electric motor 416, and motor commands 434 to electric motor 418.

In this illustrative example, motor commands 428, motor commands 430, motor commands 432, and motor commands 434 may be selected from at least one of revolutions per minute, thrust, an operating state, a recharge state, a switching frequency, a regeneration voltage, a regeneration current, or some other suitable command. These motor commands may then be implemented by group of electric motors 404.

Group of electric motors 404 may send feedback to controller 400 in this illustrative example. In particular, electric motor 412 sends feedback 436, electric motor 414 sends feedback 438, electric motor 416 sends feedback 440, and electric motor 418 sends feedback 442. Feedback 436, feedback 438, feedback 440, and feedback 442 may include at least one of revolutions per minute, a regeneration current, or some other suitable type of feedback. Feedback 436, feedback 438, feedback 440, and feedback 442 may be generated by a number of sensors within each respective motor in this illustrative example.

In this depicted example, the feedback is processed by controller 400 and used to adjust future commands sent to group of electric motors 404. In some cases, the feedback may be used as a diagnostic tool to identify problems in one of group of electric motors 404. For instance, the feedback may be used to determine if one of group of electric motors 404 is not working as desired.

Figure 5:
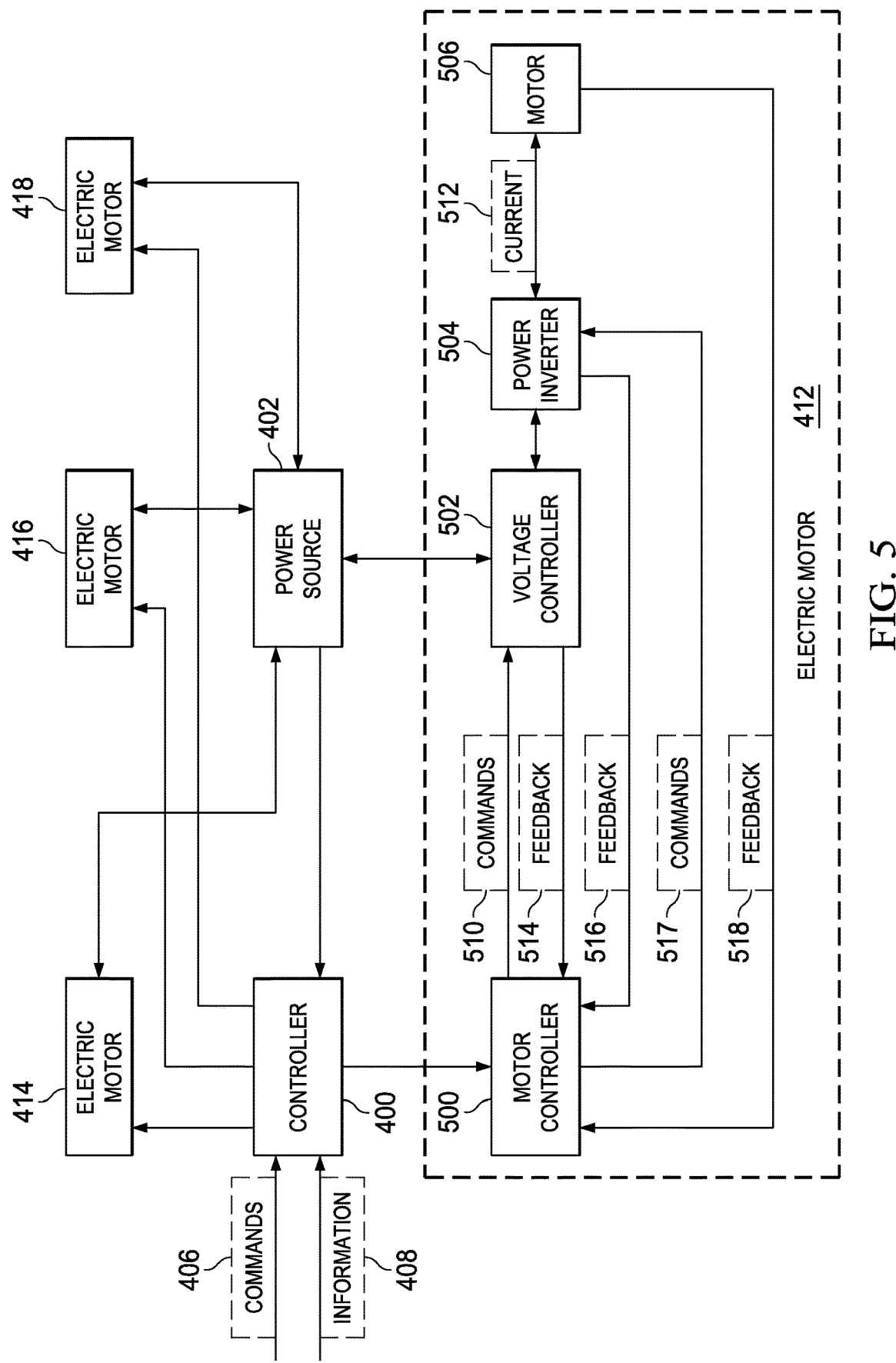
FIG. 5 is an illustration of another information flow diagram for an electric motor system in accordance with an illustrative embodiment.

Turning next to FIG. 5, another illustration of an information flow diagram for an electric motor system is depicted in accordance with an illustrative embodiment. In this depicted example, a more-detailed illustration of electric motor 412 from FIG. 4 is shown.

As depicted, electric motor 412 includes motor controller 500, voltage controller 502, power inverter (i.e., an "H" bridge) 504, and motor 506. In this illustrative example, motor controller 500 is configured to receive motor commands 428 shown in FIG. 4 from controller 400. Motor controller 500 may be selected from an impulse width modulation controller, a pulse width modulation controller, or some other suitable type of controller.

Motor controller 500 sends commands 510 to voltage controller 502 and commands 517 to power inverter 504. Voltage controller 502 may be a device configured to regulate the voltage applied to electric motor 412 in an operating state and the voltage applied to the power supply during a recharge state. For instance, voltage controller 502 chooses an appropriate voltage to charge power source 402 when in the recharge state such that electric motor 412 may charge power source 402 in a desired manner. Power inverter 504 is controlled to supply current back to power source 402 at a commanded magnitude. In other words, voltage controller 502 controls the charging voltage while power inverter 504 controls the magnitude of the current being supplied to power source 402. Voltage controller 502 may control the voltage applied to power source 402, regardless of the commanded voltage, in order to provide a desired charge setting for power source 402.

In this illustrative example, commands 510 and/or commands 517 may be commands to switch electric motor 412 from an operating state to a recharge state, or from a recharge state to an operating state. Commands 510 and commands 517 may be configured such that circuitry within one or more of voltage controller 502 and power inverter 504 is placed in an on state to allow current to flow in a desired manner.

Based on commands 517, power inverter 504 may send or receive current 512. In particular, when electric motor 412 is in an operating state, power inverter 504 sends current 512 to motor 506. When electric motor 412 is in a recharge state, power inverter 504 receives current 512 from motor 506. Motor 506 is the mechanical portion of electric motor 412 in this illustrative example.

As depicted, voltage controller 502 and power inverter 504 provide feedback 514 and feedback 516, respectively, for motor controller 500. For instance, feedback 514 may include a voltage regenerated for power source 402 from electric motor 412.

In a similar fashion, motor 506 generates feedback 518 for motor controller 500. Feedback 518 may include the measured current flowing to and from motor 506, position information of motor 506, or other suitable types of feedback. Motor controller 500 then uses this feedback to generate feedback 436 shown in FIG. 4 to controller 400, further control operation of electric motor 412 based on motor commands 428 from controller 400, or perform another suitable type of operation.

In this depicted example, while the components of an electric motor have been described with reference to electric motor 412, electric motor 414, electric motor 416, and electric motor 418 may include similar components to electric motor 412, as described herein. In other illustrative examples, one or more of group of electric motors 404 may include different components, depending on the functionality involved.

Figure 6:
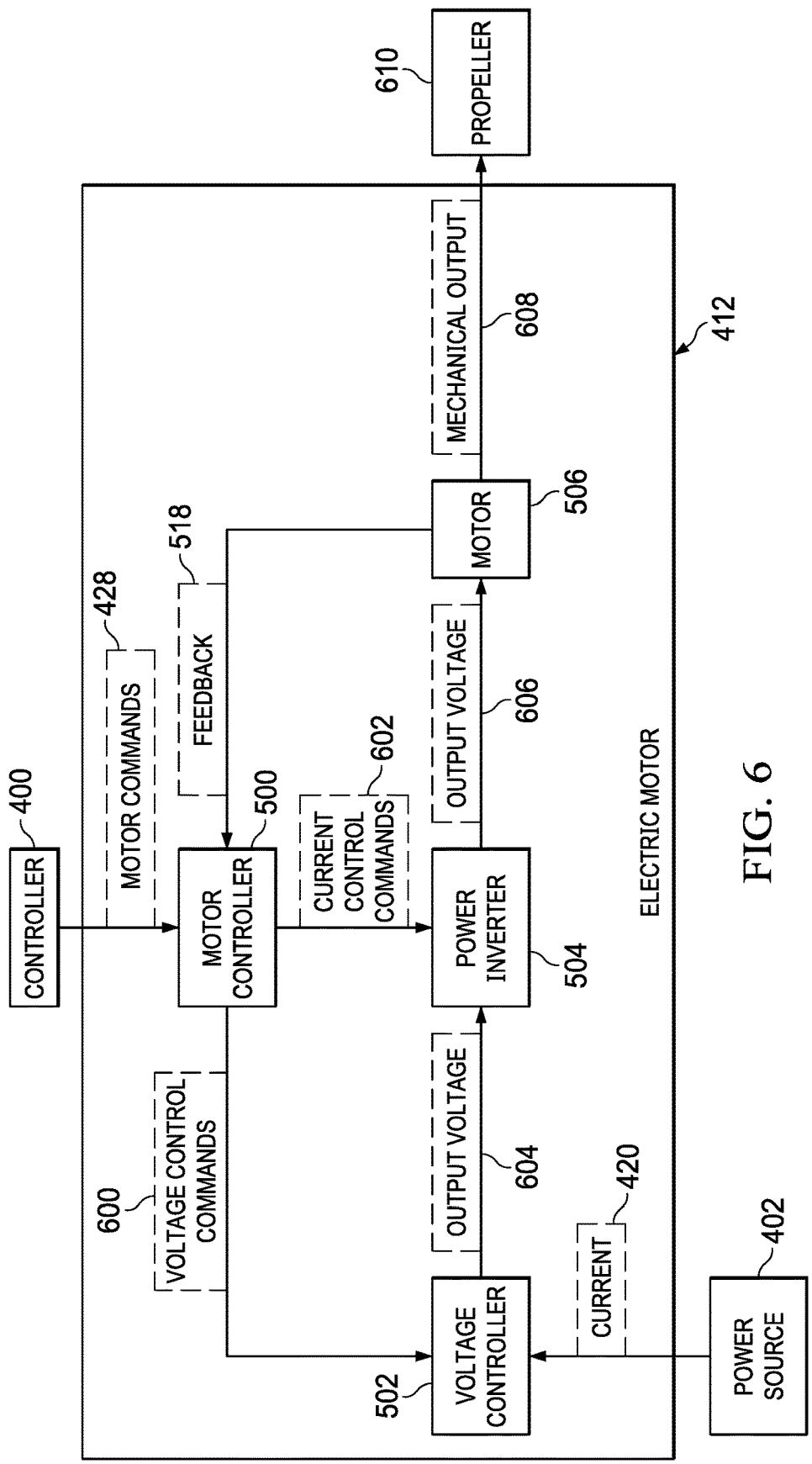
FIG. 6 is an illustration of an information flow diagram for an electric motor in an operating state in accordance with an illustrative embodiment.

With reference next to FIG. 6, an illustration of an information flow diagram for an electric motor in an operating state is depicted in accordance with an illustrative embodiment. In this depicted example, electric motor 412 from FIG. 4 is shown in an operating state. The current flow shown in this figure may be one example of the current flow during operating state 304 in FIG. 3.

As illustrated, power source 402 provides current 420 to electric motor 412, while controller 400 sends motor commands 428 to electric motor 412. Current 420 may be supplied at a constant voltage in these illustrative examples.

In this illustrative example, voltage controller 502 receives current 420. Motor controller 500 receives motor commands 428. Motor controller 500 then generates voltage control commands 600 and current control commands 602.

As illustrated, voltage control commands 600 are configured to control voltage controller 502. Voltage controller 502 is configured to control the voltage which is applied across power inverter 504 at the voltage commanded by voltage control commands 600. Output voltage 604 is applied across power inverter 504. Based on output voltage 604 of voltage controller 502 and current control commands 602 from motor controller 500, output voltage 606 is applied to motor 508. Output voltage 606 is applied at the commanded voltage and commanded current from motor controller 500 in these illustrative examples.

In this depicted example, motor 506 coverts this output voltage 606 to mechanical output 608. This mechanical power is output shaft power in these illustrative examples. Mechanical output 608 causes movement of the aircraft. For example, mechanical output 608 may turn propeller 610. In this manner, electric motor 412 and additional motors in group of electric motors 404 may provide movement for the aircraft while in an operating state.

Figure 7:
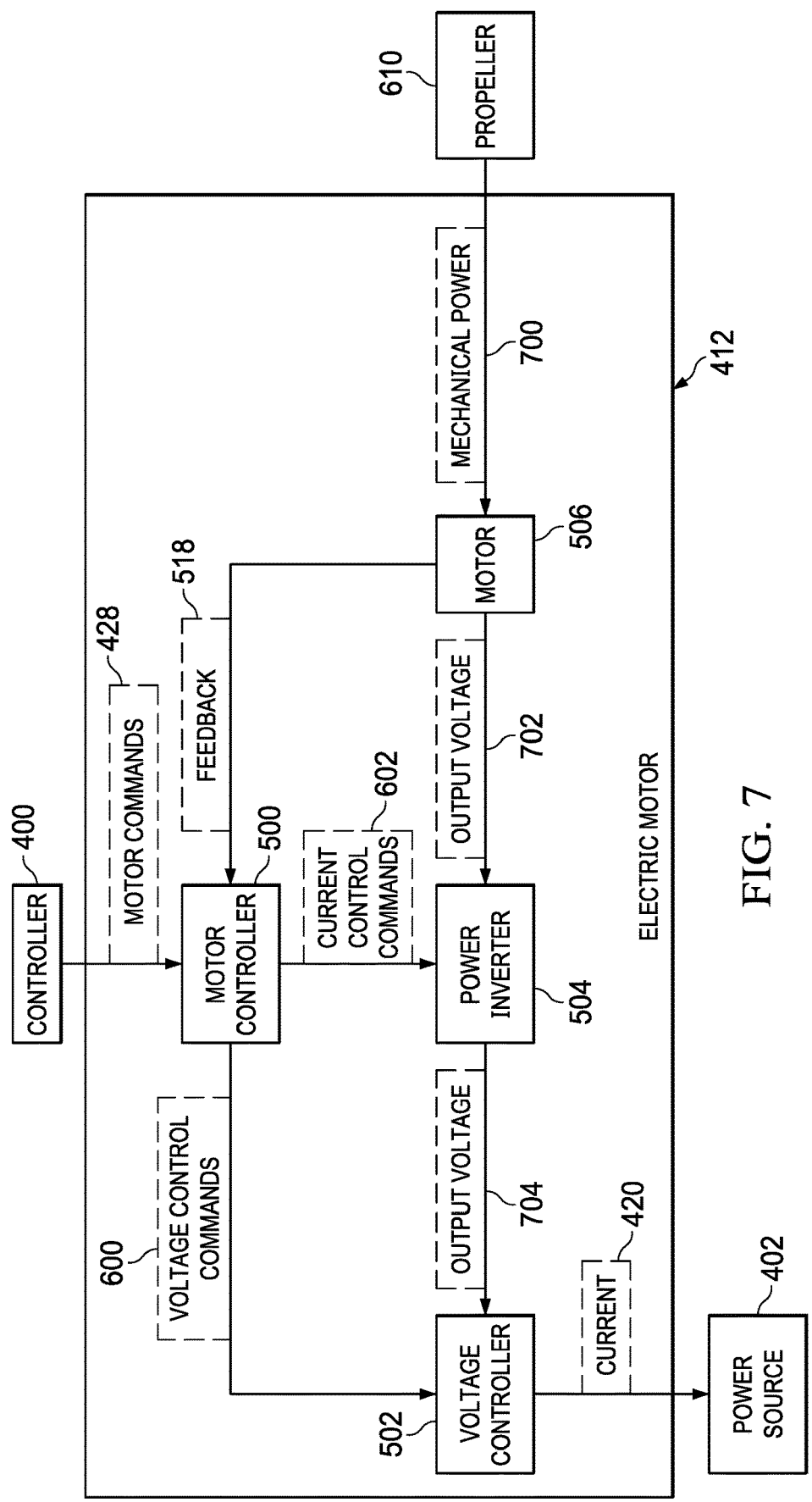
FIG. 7 is an illustration of an information flow diagram for an electric motor in a recharge state in accordance with an illustrative embodiment.

Turning now to FIG. 7, an illustration of an information flow diagram for an electric motor in a recharge state is depicted in accordance with an illustrative embodiment. In this depicted example, electric motor 412 from FIG. 4 is shown in a recharge state. The current flow shown in this figure may be one example of the current flow during recharge state 306 in FIG. 3.

As depicted, controller 400 has commanded motor controller 500 to switch electric motor 412 from an operating state to a recharge state. In this illustrative example, mechanical power 700 may be generated from wind energy spinning propeller 610. Mechanical power 700 is received by motor 506 and converted to electrical power.

As illustrated, output voltage 702 is sent to power inverter 504. Power inverter 504 uses current control commands 602 to generate output voltage 704 at a desired level of current. Output voltage 704 is then sent to voltage controller 502. Based on voltage control commands 600, voltage controller 502 sends current 420 back to power source 402 at the commanded level of voltage and current to recharge power source 402.

In this manner, electric motor 412 provides a desired level of current to recharge power source 402. In a similar fashion, electric motor 414, electric motor 416, and electric motor 418 also may provide current to recharge power source 402.

Figure 8:
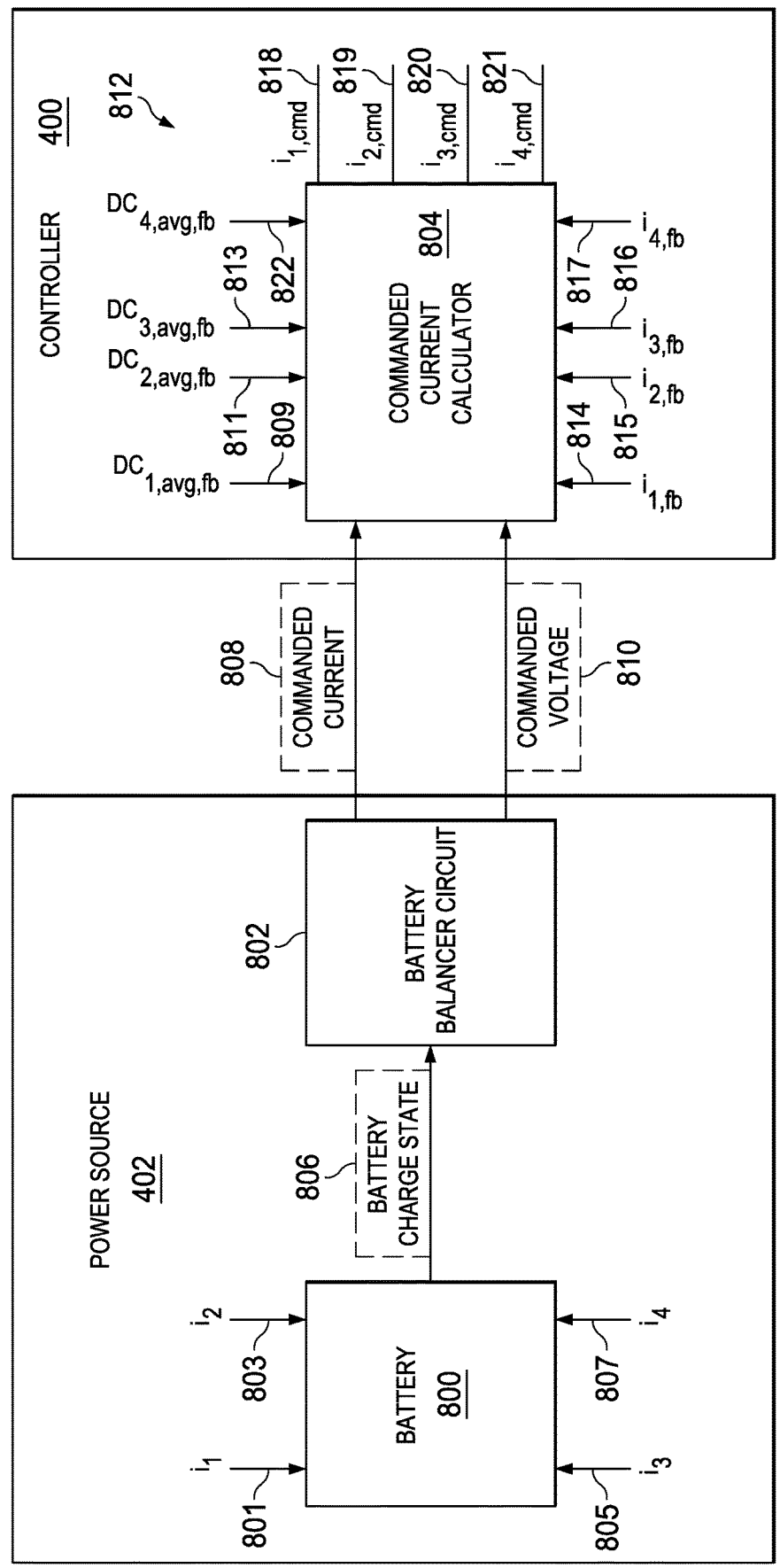
FIG. 8 is an illustration of a block diagram of a power source and a current controller in accordance with an illustrative embodiment.

With reference now to FIG. 8, an illustration of a block diagram of a power source and a current controller is depicted in accordance with an illustrative embodiment. Power source 402 takes the form of battery 800 in this illustrative example.

Power source 402 includes battery 800 and battery balancer circuit 802 in this illustrative example. Battery balancer circuit 802 is configured to balance a charge from different cells within battery 800 to increase the capacity of battery 800. Battery balancer circuit 802 is also configured to protect cells within battery 800 from undesirable overcharging.

In this illustrative example, current from each motor in group of electric motors 404 in FIG. 4 is sent to battery 800. For instance, a first current 801 is sent from electric motor 412, a second current 803 is sent from electric motor 414, a third current 805 is sent from electric motor 416, and a fourth current 807 is sent from electric motor 418 in FIG. 4. These currents are used to recharge battery 800 in these illustrative examples.

As depicted, in response to receiving one or more of first current 801, second current 803, third current 805, and fourth current 807, battery charge state 806 is sent from battery 800 to battery balancer circuit 802. Battery charge state 806 is a charge state for battery 800 at a current time.

In this illustrative example, battery balancer circuit 802 uses battery charge state 806 to determine commanded current 808 and commanded voltage 810. Commanded current 808 is a current level for operation of one or more of group of electric motors 404. This current is determined by the current needs of battery 800. Commanded voltage 810 is a voltage level for operation of one or more of group of electric motors 404. This voltage is determined by voltage needs of battery 800.

As depicted, battery balancer circuit 802 sends commanded current 808 and commanded voltage 810 to commanded current calculator 804. Commanded current calculator 804 is configured to receive number of inputs 812 from group of electric motors 404, commanded current 808, and commanded voltage 810 and use number of inputs 812 to determine a desired level of commanded current for each of group of electric motors 404.

In this illustrative example, number of inputs 812 may take several different forms. For instances, number of inputs 812 may take the form of voltage measurements, current measurements, average duty cycle, a combination thereof, and other types of information from group of electric motors 404.

In this depicted example, commanded current calculator 804 receives average duty cycle 809, average duty cycle 811, average duty cycle 813, and average duty cycle 822 from electric motor 412, electric motor 414, electric motor 416, and electric motor 418, respectively. Average duty cycle 809, average duty cycle 811, average duty cycle 813, and average duty cycle 822 may be an average of the duty cycles measured for electric motor 412, electric motor 414, electric motor 416, and electric motor 418, respectively, over a selected period of time.

Commanded current calculator 804 also receives current 814, current 815, current 816, and current 817 from electric motor 412, electric motor 414, electric motor 416, and electric motor 418, respectively. Current 814, current 815, current 816, and current 817 may be the actual current output of electric motor 412, electric motor 414, electric motor 416, and electric motor 418, respectively, in this illustrative example.

From number of inputs 812, commanded current calculator 804 generates commanded current 818 for electric motor 412, commanded current 819 for electric motor 414, commanded current 820 for electric motor 416, and commanded current 821 for electric motor 418. In this illustrative example, commanded current calculator 804 is located in controller 400. In some illustrative examples, commanded current calculator 804 may be located in a different component within the electric aircraft, remote to the electric aircraft, or some combination thereof.

Turning now to FIG. 9, an illustration of equations for calculating a commanded current is depicted in accordance with an illustrative embodiment. In this depicted example, equation 900 may be used by commanded current calculator 804 from FIG. 8 to calculate commanded currents for group of electric motors 404 in FIG. 4.

As depicted, equation 900 is used by commanded current calculator 804 to determine an effective current, $i_n$/100% DC, for each of group of electric motors 404, where $i_{nfb}$ is a measured current for the motor, while $DC_{nfb}$ is the average duty cycle for the motor. Once effective current is calculated for all motors in group of electric motors 404, these effective currents may be input into equation 902 to determine the total effective current, $i_{tot}$/100% DC.

Next, commanded current, $i_{ncmd}$, is determined using equation 904. In equation 904, $i_{cmd,tot}$ is the total commanded current for group of electric motors 404. The commanded current for each of group of electric motors 404 is proportional to the measured current of each of group of electric motors 404. In this manner, commanded current for group of electric motors 404 may be determined to operate the electric aircraft in a desired manner in both the operating state and the recharge state.

Figure 10:
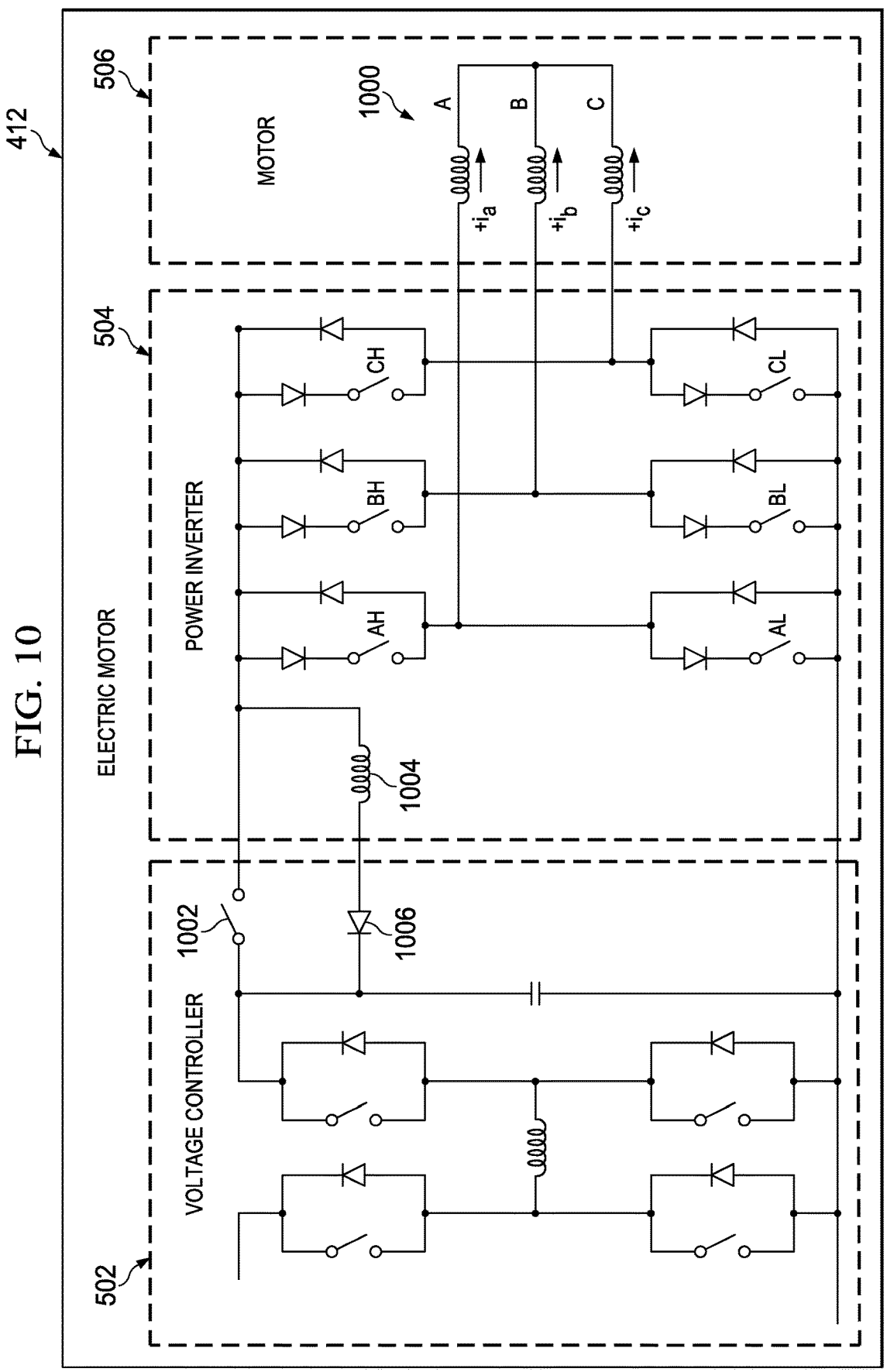
FIG. 10 is an illustration of a circuit diagram of a voltage controller and a power inverter for an electric motor in accordance with an illustrative embodiment.

With reference next to FIG. 10, an illustration of a circuit diagram of a voltage controller and a power inverter for an electric motor is depicted in accordance with an illustrative embodiment. In this depicted example, circuit diagrams for voltage controller 502 and power inverter 504 are shown.

Power inverter 504 is associated with coils 1000 within motor 506 in this illustrative example. Motor controller 500 is configured to control the current to coils 1000 to move electric motor 412 in a desired manner.

In this depicted example, voltage controller 502 is physically associated with power inverter 504 using switch 1002, inductor 1004, and diode 1006. Switch 1002 is configured to open and close to direct flow of current between voltage controller 502 and power inverter 504. Power inverter 504 then provides current to one or more of coils 1000 in this illustrative example.

As illustrated, inductor 1004 and diode 1006 are configured to add capability to voltage controller 502 and power inverter 504 for current to flow in both directions, depending on the position of switch 1002. In other words, as the state of electric motor 412 changes, switch 1002 moves from an open position to a closed position.

For instance, when electric motor 412 is in an operating state, switch 1002 is closed and current flows to power inverter 504 and coils 1000 to provide propulsion for electric motor 412. When electric motor 412 is in a recharge state, switch 1002 is open and current flows through inductor 1004 and diode 1006 to voltage controller 502 to recharge the power source in these illustrative examples.

Figure 11:
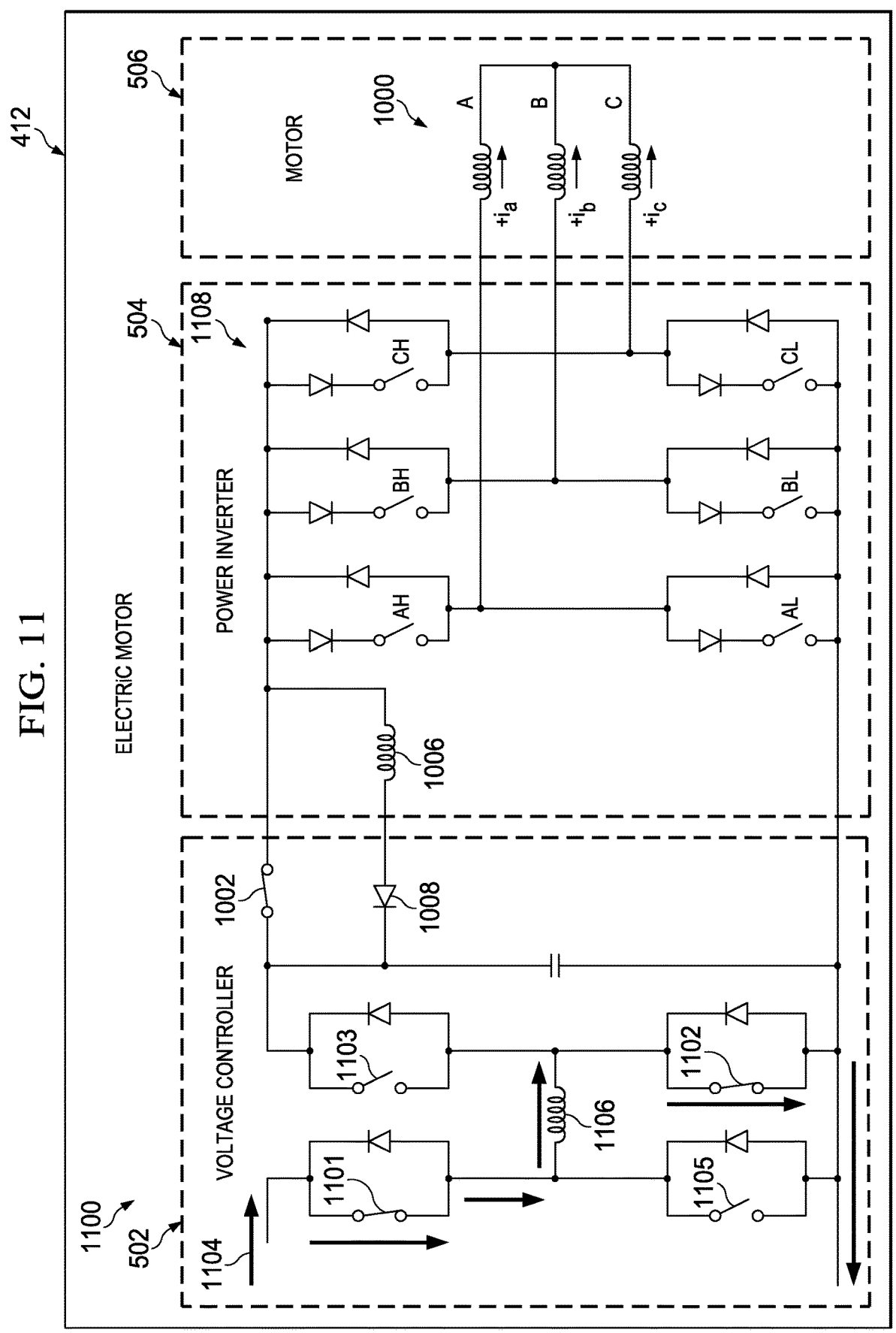
FIG. 11 is an illustration of a current flow through a voltage controller in accordance with an illustrative embodiment.
Figure 12:
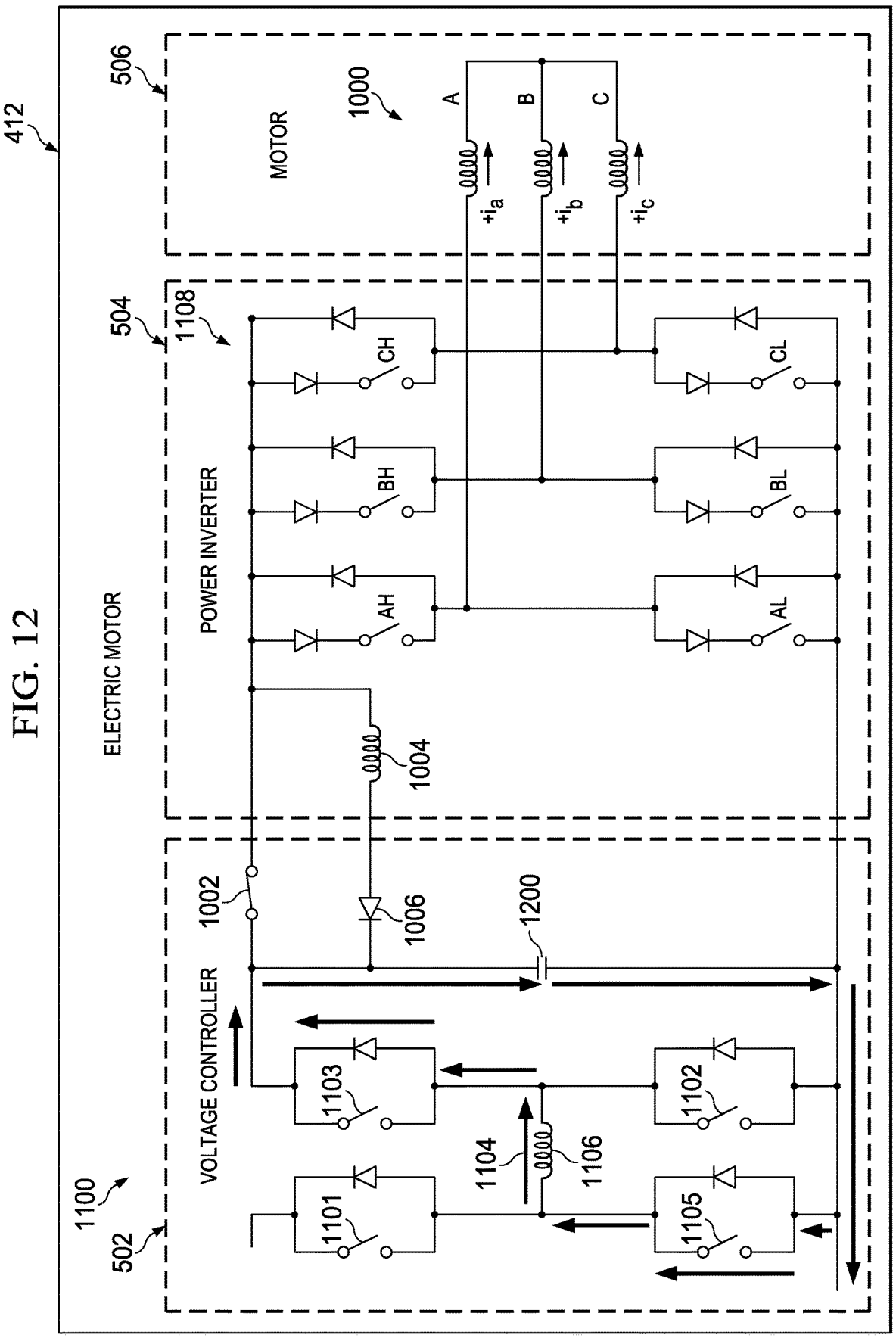
FIG. 12 is an illustration of a current flow through a voltage controller in accordance with an illustrative embodiment.
Figure 13:
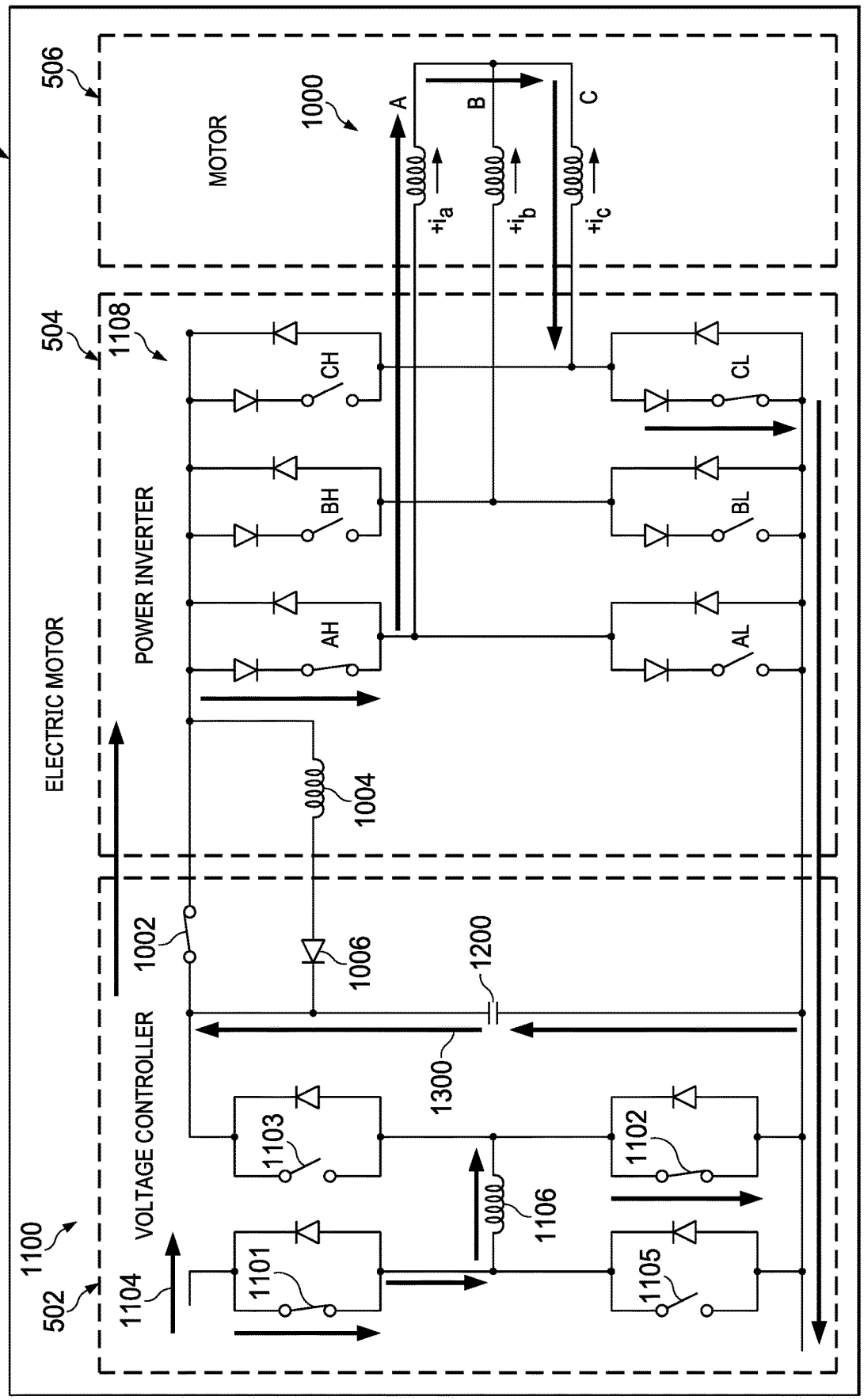
FIG. 13 is an illustration of a voltage controller and a power inverter in accordance with an illustrative embodiment.
Figure 14:
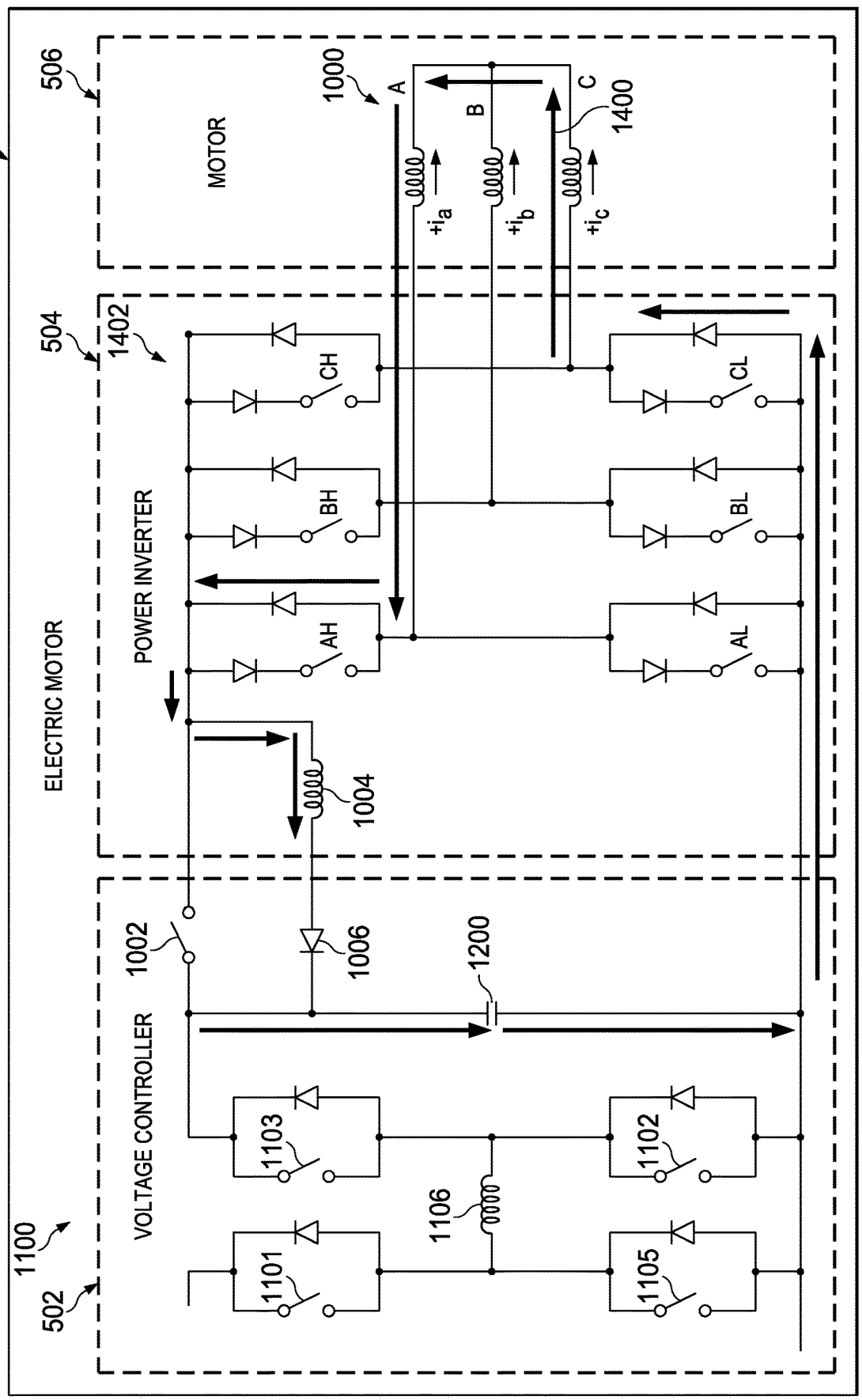
FIG. 14 is an illustration of a reverse current flow through a voltage controller and a power inverter in accordance with an illustrative embodiment.
Figure 15:
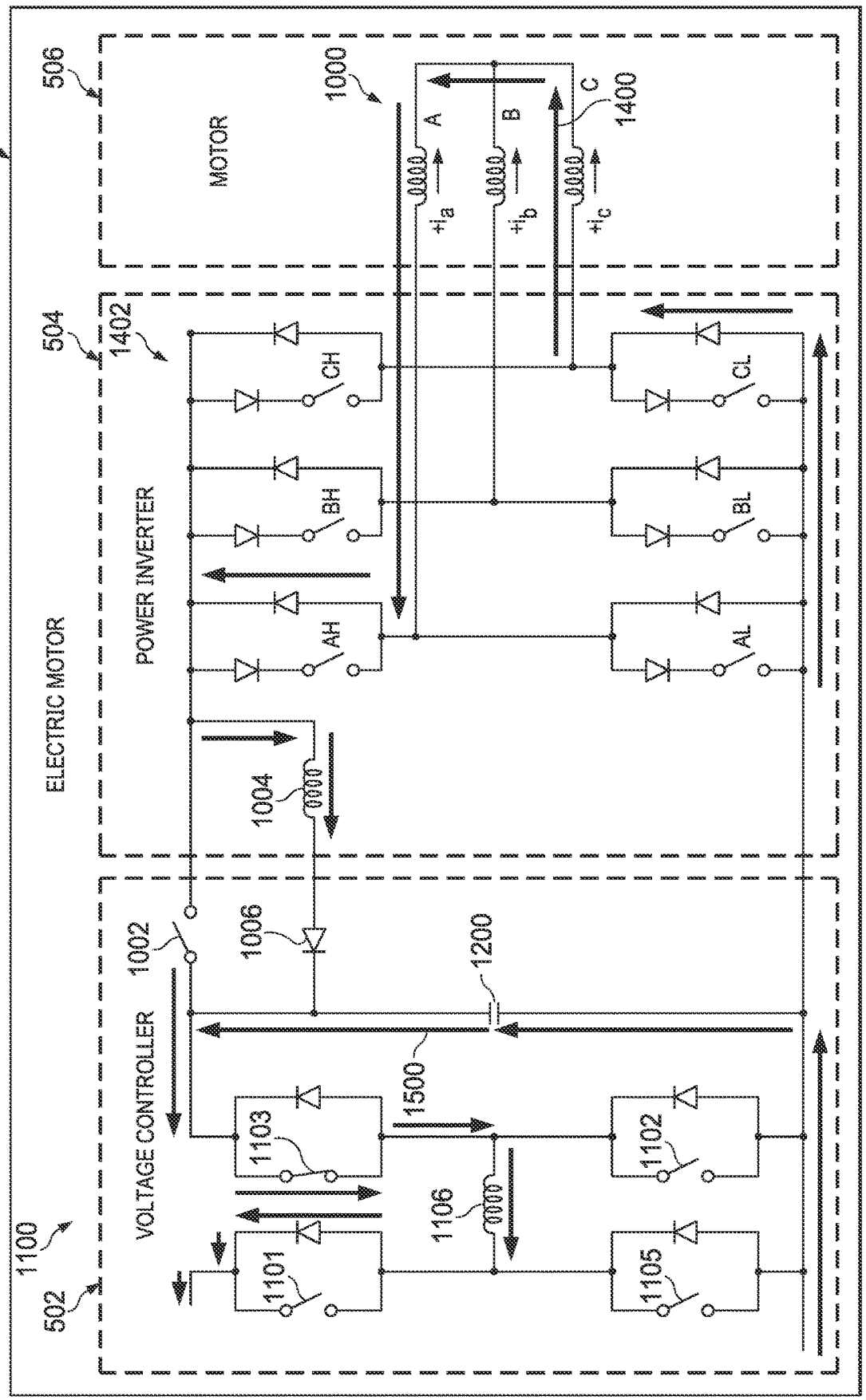
FIG. 15 is an illustration of a voltage controller and a power inverter in accordance with an illustrative embodiment.

FIGS. 11-15 illustrate a circuit diagram of a voltage controller and a power inverter for an electric motor in accordance with an illustrative embodiment. In particular, FIGS. 11-15 show the current flow through voltage controller 502, power inverter 504, and motor 506 in electric motor 412 during various stages of operation. FIGS. 11-13 illustrate a current flow during an operating state, while FIG. 14 and FIG. 15 show current during a recharge state.

Turning to FIG. 11, an illustration of a current flow through a voltage controller is depicted in accordance with an illustrative embodiment. In this depicted example, voltage controller 502 includes switches 1100, while power inverter 504 includes number of switches 1108. Switches 1100 include switch 1101, switch 1102, switch 1103, and switch 1105.

As illustrated, switch 1101 and switch 1102 in switches 1100 have been closed such that current 1104 flows through voltage controller 502. Switch 1002 is also closed in this depicted example. Current 1104 may be configured to "charge up" inductor 1106. In other words, inductor 1106 may temporarily store energy as a magnetic field. Number of switches 1108 for coils 1000 remain open in this illustrative example.

In FIG. 12, an illustration of a current flow through a voltage controller is depicted in accordance with an illustrative embodiment. In this illustrative example, switch 1002 is closed. Current 1104 flows to capacitor 1200. Capacitor 1200 is configured to store energy in an electric field.

As depicted, the charging of capacitor 1200 will change the voltage across number of switches 1108 to allow number of switches 1108 to run at a desired voltage. By controlling a duty cycle of switches 1100 in voltage controller 502, the voltage across power inverter 504 may be quickly and automatically controlled. In this illustrative example, controlling the duty cycle of switches 1100 drives the voltage across power inverter 504 to a desired operational voltage for current control. Typically, this voltage will be such that the duty cycle in number of switches 1108 runs with a duty cycle close to one hundred percent. The higher the percentage of the duty cycle, the more efficient operation of the system will be. Accordingly, when number of switches 1108 runs with a duty cycle close to one hundred percent, the system is operating at the most efficient mode of operation.

With reference to FIG. 13, an illustration of a voltage controller and a power inverter is depicted in accordance with an illustrative embodiment. In this illustrative example, a charge from capacitor 1200 is used to drive power inverter 504. In particular, current 1300 is supplied by capacitor 1200.

While capacitor 1200 is supplying current 1300, the voltage of capacitor 1200 begins to decrease. In response, motor controller 500 will supply additional current 1104 to capacitor 1200 to maintain a desired voltage across power inverter 504. In this depicted example, current 1300 flows to number of switches 1108 and coils 1000 to provide propulsion for electric motor 412.

In FIG. 14, an illustration of a reverse current flow through a voltage controller and a power inverter is depicted in accordance with an illustrative embodiment. In this depicted example, electric motor 412 is configured to operate in a recharge state to recharge power source 402. Accordingly, switch 1002 is open in this illustrative example, forcing current to flow through inductor 1004 and diode 1006 to voltage controller 502.

As illustrated, electromotive force from coils 1000 produces a voltage which drives current 1400 through number of diodes 1402. Current travels through inductor 1004 and diode 1006 to charge capacitor 1200 in voltage controller 502. The voltage across capacitor 1200 is maintained at a charging voltage.

In this stage, current does not flow to power source 402 because switch 1002 is open. As a result, capacitor 1200 continues to be charged until capacitor 1200 reaches a desired voltage.

Referring next to FIG. 15, an illustration of a voltage controller and a power inverter is depicted in accordance with an illustrative embodiment. In this depicted example, switch 1103 in voltage controller 502 is now closed.

As illustrated, capacitor 1200 discharges and current 1500 flows through voltage controller 502 back to power source 402. In this manner, voltage controller 502 controls switches 1100 to allow current 1500 to flow back to power source 402 at a voltage output by capacitor 1200. As a result, power source 402 may be recharged with a reduced risk of damage to power source 402.

The different components shown in FIGS. 4-15 may be illustrative examples of how components shown in block form in FIG. 2 and FIG. 3 can be implemented. Additionally, some of the components in FIGS. 4-15 may be combined with components in FIG. 2 and FIG. 3, used with components in FIG. 2 and FIG. 3, or a combination of the two.

For example, although electric aircraft 200 has been described with reference to a quadcopter, electric aircraft 200 also may be a helicopter. In this instance, mechanical motor components may be replaced by electric motor components as shown in FIGS. 2-15. As an example, a helicopter with a fixed pitch tail rotor may be driven by an electric motor.

In this illustrative example, the removal of mechanical components, such as a drive shaft or gearbox, may significantly decrease the weight, cost, and complexity for manufacturing the helicopter. Moreover, when mechanical components are replaced by electrical components, points of failure for mechanical components may be reduced or eliminated, increasing the reliability of the motor system.

In this depicted example, an impulse width modulation controller may be used to control the electric motor and an energy-harvesting system may be used to recharge a power source within the helicopter. The use of an impulse width modulation controller allows the helicopter to operate at variable speeds.

In still other illustrative examples, more than four motors may be present in group of electric motors 404 shown in FIG. 4. For example, five motors, ten motors, fifteen motors, or some other suitable number of motors may be used for a propulsion system and an energy-harvesting system.

Figure 16:
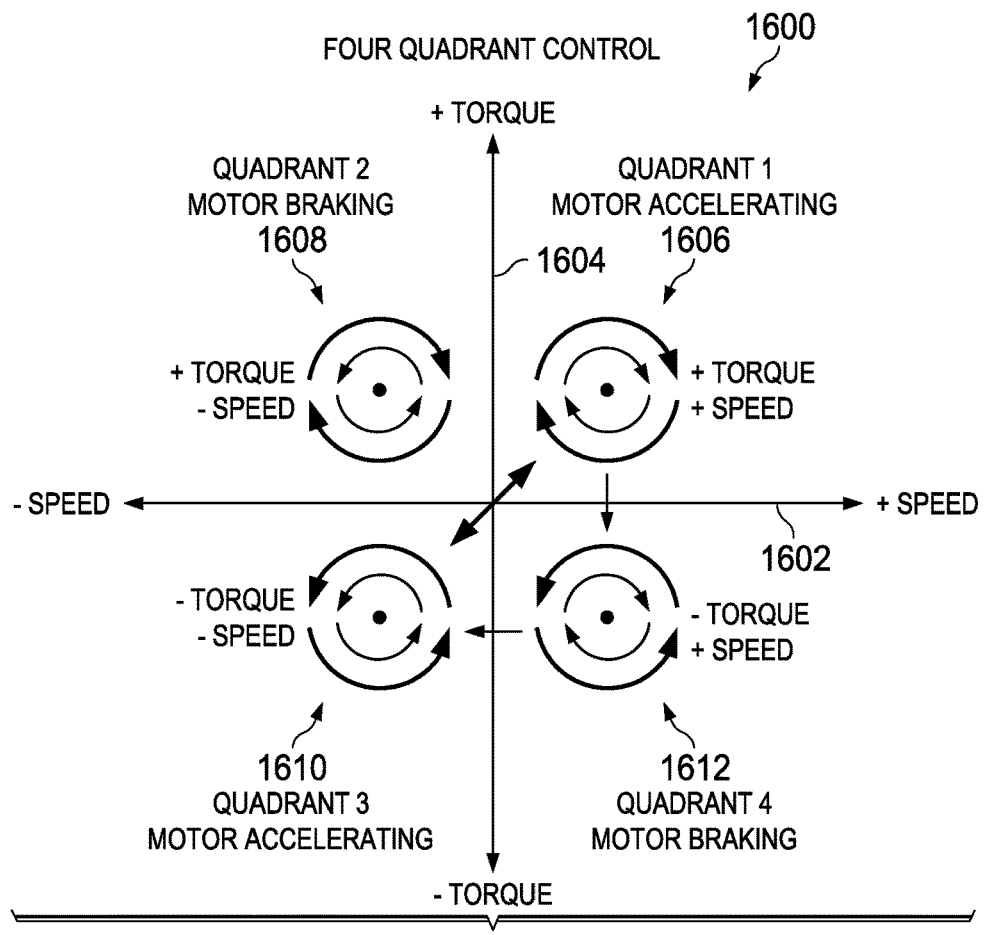
FIG. 16 is an illustration of four-quadrant control in accordance with an illustrative embodiment.

With reference now to FIG. 16, an illustration of four-quadrant control, is depicted in accordance with an illustrative embodiment. Controller 210 may be used to control electric motor 224 of electric aircraft 200 in FIG. 2 to operate in the four quadrants as illustrated by graph 1600. Controller 210 is configured to control operation of electric motor 224 in one or more of the four quadrants illustrated in graph 1600.

As depicted, graph 1600 illustrates torque versus speed. X-axis 1602 represents speed. Y-axis 1604 represents torque. In this illustrative example, first quadrant 1606, second quadrant 1608, third quadrant 1610, and fourth quadrant 1612 are illustrated. First quadrant 1606 represents acceleration of the motor in which speed is in a first direction with torque in a first direction. Second quadrant 1608 represents motor braking in which torque is in the forward direction while speed is in the reverse direction. Third quadrant 1610 represents acceleration of the motor with torque in a second direction and speed in a second direction. Fourth quadrant 1612 represents braking of the motor running in reverse. In this quadrant, the speed is in the forward direction while the torque is in the reverse direction.

The different electric motors in the illustrative examples may be controlled to operate in one or more of the four different quadrants described in FIG. 16. For example, controller 210 in FIG. 2 may control electric motor 224 to operate in one or more of first quadrant 1606, second quadrant 1608, third quadrant 1610, and fourth quadrant 1612.

Figure 17:
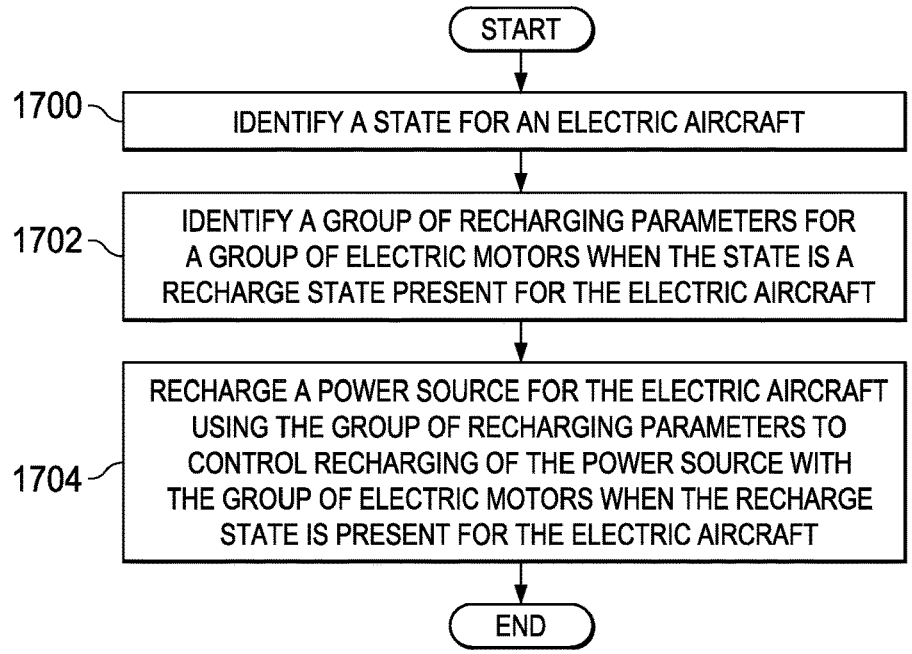
FIG. 17 is an illustration of a flowchart of a process for controlling an electric aircraft in accordance with an illustrative embodiment.

With reference next to FIG. 17, an illustration of a flowchart of a process for controlling an electric aircraft is depicted in accordance with an illustrative embodiment. The process illustrated in FIG. 17 may be implemented in electric aircraft 200 in FIG. 2. In particular, one or more of the different operations may be implemented using controller 210 in FIG. 2 in electric aircraft 200.

The process begins by identifying a state for an electric aircraft (operation 1700). For instance, state 220 for electric aircraft 200 in FIG. 2 may be identified by controller 210. State 220 may be operating state 304 or recharge state 306 in this illustrative example.

Next, a group of recharging parameters is identified for a group of electric motors when the state is a recharge state present for the electric aircraft (operation 1702). For instance, group of recharging parameters 222 is identified for group of electric motors 214 when recharge state 306 is present for group of electric motors 214. In this depicted example, group of electric motors 214 is configured to move electric aircraft 200.

A power source for the electric aircraft is then recharged using the group of recharging parameters to control recharging of the power source with the group of electric motors when the recharge state is present for the electric aircraft (operation 1704) with the process terminating thereafter. In this illustrative example, power source 208 for electric aircraft 200 is recharged using group of recharging parameters 222 to control recharging of power source 208 with group of electric motors 214 when recharge state 306 is present for electric aircraft 200. For instance, group of recharging parameters 222 may be used to recharge battery system 209 in one illustrative example.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 18:
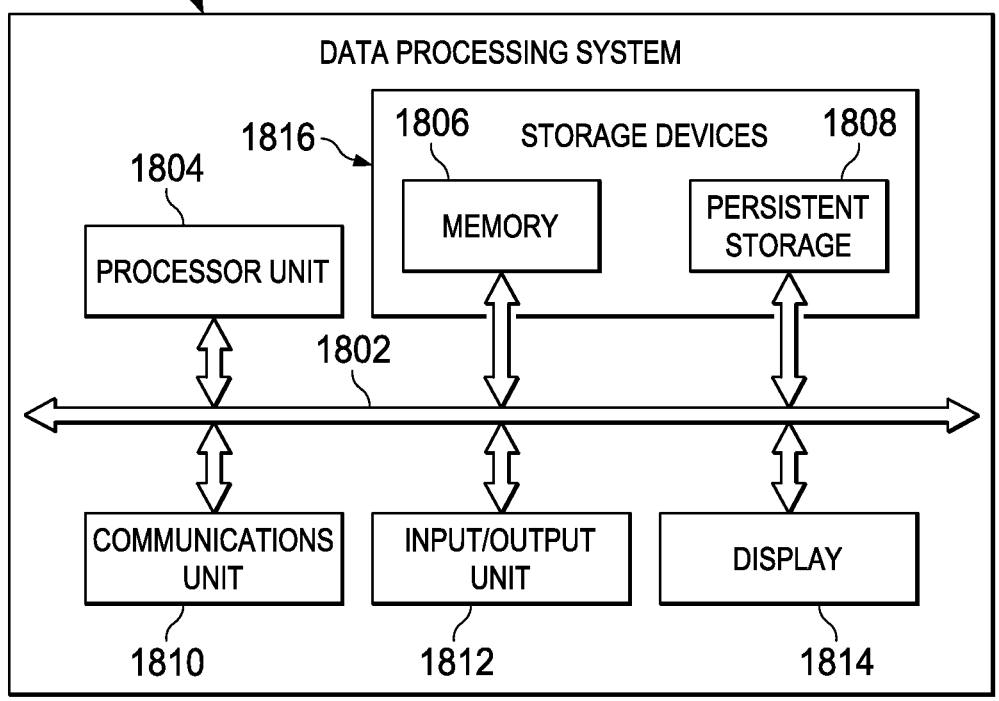
FIG. 18 is an illustration of a data processing system in the form of a block diagram in accordance with an illustrative embodiment.
Figure 18:
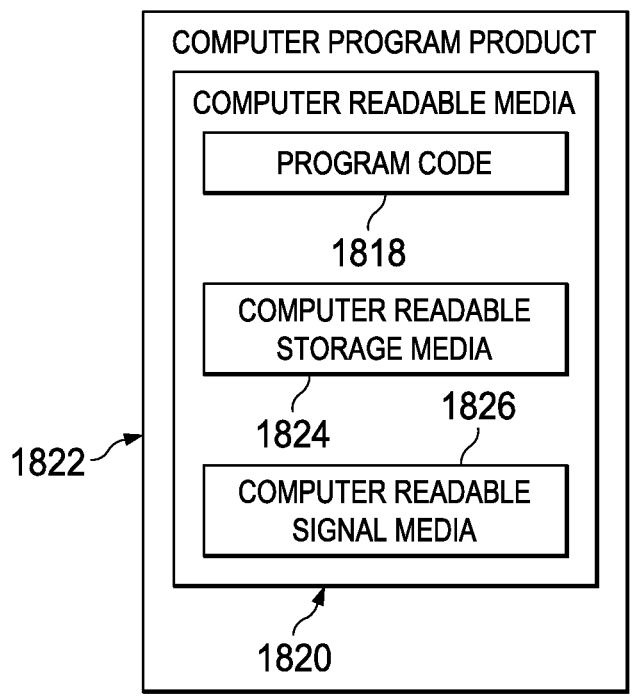

Turning now to FIG. 18, an illustration of a data processing system in the form of a block diagram is depicted in accordance with an illustrative embodiment. Data processing system 1800 may be used to implement one or more computers in computer system 211 in FIG. 2. As depicted, data processing system 1800 includes communications framework 1802, which provides communications between processor unit 1804, storage devices 1806, communications unit 1808, input/output unit 1810, and display 1812. In some cases, communications framework 1802 may be implemented as a bus system.

Processor unit 1804 is configured to execute instructions for software to perform a number of operations. Processor unit 1804 may comprise a number of processors, a multi-processor core, and/or some other type of processor, depending on the implementation. In some cases, processor unit 1804 may take the form of a hardware unit, such as a circuit system, an application specific integrated circuit (ASIC), a programmable logic device, or some other suitable type of hardware unit.

Instructions for the operating system, applications, and/or programs run by processor unit 1804 may be located in storage devices 1806. Storage devices 1806 may be in communication with processor unit 1804 through communications framework 1802. As used herein, a storage device, also referred to as a computer readable storage device, is any piece of hardware capable of storing information on a temporary and/or permanent basis. This information may include, but is not limited to, data, program code, and/or other information.

Memory 1814 and persistent storage 1816 are examples of storage devices 1806. Memory 1814 may take the form of, for example, a random access memory or some type of volatile or non-volatile storage device. Persistent storage 1816 may comprise any number of components or devices. For example, persistent storage 1816 may comprise a hard drive, a flash memory, a rewritable optical disk, a rewritable magnetic tape, or some combination of the above. The media used by persistent storage 1816 may or may not be removable.

Communications unit 1808 allows data processing system 1800 to communicate with other data processing systems and/or devices. Communications unit 1808 may provide communications using physical and/or wireless communications links.

Input/output unit 1810 allows input to be received from and output to be sent to other devices connected to data processing system 1800. For example, input/output unit 1810 may allow user input to be received through a keyboard, a mouse, and/or some other type of input device. As another example, input/output unit 1810 may allow output to be sent to a printer connected to data processing system 1800.

Display 1812 is configured to display information to a user. Display 1812 may comprise, for example, without limitation, a monitor, a touch screen, a laser display, a holographic display, a virtual display device, and/or some other type of display device.

In this illustrative example, the processes of the different illustrative embodiments may be performed by processor unit 1804 using computer-implemented instructions. These instructions may be referred to as program code, computer usable program code, or computer readable program code and may be read and executed by one or more processors in processor unit 1804.

In these examples, program code 1818 is located in a functional form on computer readable media 1820, which is selectively removable, and may be loaded onto or transferred to data processing system 1800 for execution by processor unit 1804. Program code 1818 and computer readable media 1820 together form computer program product 1822. In this illustrative example, computer readable media 1820 may be computer readable storage media 1824 or computer readable signal media 1826.

Computer readable storage media 1824 is a physical or tangible storage device used to store program code 1818 rather than a medium that propagates or transmits program code 1818. Computer readable storage media 1824 may be, for example, without limitation, an optical or magnetic disk or a persistent storage device that is connected to data processing system 1800.

Alternatively, program code 1818 may be transferred to data processing system 1800 using computer readable signal media 1826. Computer readable signal media 1826 may be, for example, a propagated data signal containing program code 1818. This data signal may be an electromagnetic signal, an optical signal, and/or some other type of signal that can be transmitted over physical and/or wireless communications links.

The illustration of data processing system 1800 in FIG. 18 is not meant to provide architectural limitations to the manner in which the illustrative embodiments may be implemented. The different illustrative embodiments may be implemented in a data processing system that includes components in addition to or in place of those illustrated for data processing system 1800. Further, components shown in FIG. 18 may be varied from the illustrative examples shown.

Illustrative embodiments of the disclosure may be described in the context of aircraft manufacturing and service method 1900 as shown in FIG. 19 and aircraft 2000 as shown in FIG. 20. Turning first to FIG. 19, an illustration of a block diagram of an aircraft manufacturing and service method is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 may go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of a block diagram of an aircraft is depicted in which an illustrative embodiment may be implemented. In this example, aircraft 2000 is produced by aircraft manufacturing and service method 1900 in FIG. 19 and may include airframe 2002 with plurality of systems 2004 and interior 2006. Aircraft 2000 may be an electric aircraft in accordance with an illustrative embodiment.

Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1900 in FIG. 19.

In one illustrative example, components or subassemblies produced in component and subassembly manufacturing 1906 in FIG. 19 may be fabricated or manufactured in a manner similar to components or subassemblies produced while aircraft 2000 is in service 1912 in FIG. 19. As yet another example, one or more apparatus embodiments, method embodiments, or a combination thereof may be utilized during production stages, such as component and subassembly manufacturing 1906 and system integration 1908 in FIG. 19. One or more apparatus embodiments, method embodiments, or a combination thereof may be utilized while aircraft 2000 is in service 1912 and/or during maintenance and service 1914 in FIG. 19. The use of a number of the different illustrative embodiments may substantially expedite the assembly of and/or reduce the cost of aircraft 2000.

In particular, electric motor 224 from FIG. 2 and the components within electric motor 224 may be installed during any one of the stages of aircraft manufacturing and service method 1900. For example, without limitation, electric motor 224 and the components within electric motor 224 may be installed during at least one of component and subassembly manufacturing 1906, system integration 1908, routine maintenance and service 1914, or some other stage of aircraft manufacturing and service method 1900. Moreover, electric propulsion system 204, energy-harvesting system 206, and controller 210 may be used during in-service 1912 to control aircraft 2000 in a desired manner.

Thus, the illustrative embodiments provide a method and apparatus for recharging a battery system. In one illustrative example, an apparatus comprises a controller. The controller is configured to identify a state for an aircraft and identify a group of recharging parameters for a number of electric motors. The number of electric motors is configured to move the aircraft through the air when an operating state is present for the aircraft. The controller is further configured to recharge a battery system for the aircraft using the group of parameters and control recharging of the battery system with the group of electric motors when the recharge state is present for the aircraft.

The illustrative embodiments enable recharge capabilities for an electric aircraft while the electric aircraft is in the field. Rather than returning to base, an electric aircraft may find a place to rest and use its propulsion system as an energy-harvesting system to generate energy from wind power. In this manner, power supplies for electric aircraft may be recharged and missions may be continued longer than with currently used electric aircraft. Moreover, with the use of a voltage controller and power inverter, power may be supplied back to the power source, such as a battery system, at a desired voltage and current level such that the power source is less likely to be damaged during recharging.

The circuit architecture for an illustrative embodiment allows a desired level of current to flow in two directions, without a substantial increase in weight, complexity, cost, or a combination thereof for manufacturing the electric aircraft. Additionally, a controller configured to communicate with the power source and the group of electric motors receives constant feedback to aid in determining current commands for continued operation of one or more electric motors. As a result, four-quadrant control of the electric motors may be realized to propel and recharge an electric aircraft.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft that comprises:
multiple electric motor assemblies connected to a plurality of propellers;
a source of electric power connected to and configured to power each of the multiple electric motor assemblies, such that each electric motor assembly of the multiple electric motor assemblies is configured to parasitically charge the source of electric power and respectively comprises:
an operating state and a recharge state;
a power inverter that comprises only one inductor within the power inverter;
a motor connected to the power inverter; and
a voltage controller that comprises:
a first pair of switches connected to the source of electric power;
a second pair of switches connected to the source of electric power;
a single diode connected to the inductor within the power inverter;
only one inductor within the voltage controller located between and connected to the first pair of switches and the second pair of switches and configured to store energy;
a switch, distinct from the first pair of switches and the second pair of switches, connected to the inductor within the power inverter and configured to:
direct current from the voltage controller to the power inverter responsive to the electric motor assembly being in the operating state and the switch connected to the inductor within the voltage controller being closed; and
direct current through the inductor within the voltage controller to the source of electric power responsive to the electric motor assembly being in the recharge state and the switch connected to the inductor within the voltage controller being open;
only one capacitor that comprises a first terminal and a second terminal, the capacitor being configured to:
receive an energy from the one inductor within the voltage controller;
maintain a desired voltage;
limit a voltage output from the voltage controller that recharges the source of electric power; and
drive the power inverter;
the first terminal of the one capacitor connected to:
the single diode; and
a first switch of the first pair of switches; and
the second terminal of the one capacitor connected to:
a first switch of the second pair of switches; and
a series of switches within the power inverter.

2. The aircraft of claim 1, further comprising:
a controller programmed to:
control the voltage controller and the power inverter in each electric motor assembly; and
identify a recharging parameter selected from one of a total current or a voltage for each motor; and
wherein:
the one capacitor is configured to maintain the desired voltage and drive the power inverter with a current based upon a duty cycle of the first pair of switches and the second pair of switches to power each motor; and
the voltage controller is programmed to receive a commanded current from a commanded current calculator.

3. The aircraft of claim 1, further comprising a controller programmed to identify a recharging parameter comprising a current from each motor.

4. The aircraft of claim 1, further comprising:
the source of electric power being a battery;
a battery balancer circuit configured to monitor a battery charge state of the battery; and
a controller programmed to, respectively for each of the multiple electric motor assemblies:
open or close the switch connected to the inductor within the power inverter and the capacitor in the voltage controller and thereby change, based upon a charge state received from the battery, each electric motor assembly between the operating state and the recharge state;
control a duty cycle for each switch in the first pair of switches connected to the battery and the second pair of switches within the voltage controller and thereby control current to the capacitor in the voltage controller;
change a direction of a torque of each electric motor assembly; and
calculate a command current for each electric motor assembly based upon:
a commanded current from the battery balancer circuit;
a commanded voltage from the battery balancer circuit;
an average duty cycle of each electric motor assembly; and
an actual current output of each electric motor assembly.

5. The aircraft of claim 4, further comprising:
each motor configured to turn a corresponding one of the plurality of propellers;
the battery balancer circuit configured to use the battery charge state to determine a total commanded current for the multiple electric motor assemblies, wherein the total commanded current is determined by current needs of the battery;
a commanded current calculator programmed to determine a commanded current for each electric motor assembly in the multiple electric motor assemblies from the total commanded current, wherein the commanded current for each electric motor assembly in the multiple electric motor assemblies is proportional to a measured current of each electric motor assembly; and
a controller connected to each electric motor assembly and programmed to control the first pair of switches and the second pair of switches in each electric motor in the multiple electric motor assemblies based upon the commanded current for each electric motor assembly to control a current provided from each electric motor assembly in the recharge state to the commanded current for each electric motor assembly.

6. The aircraft of claim 5, wherein the commanded current calculator is programmed to:
receive a measured current for each electric motor assembly in the multiple electric motor assemblies;
receive an average duty cycle for each electric motor assembly in the multiple electric motor assemblies;
determine an effective current for each electric motor assembly in the multiple electric motor assemblies based upon a quotient of the measured current for each motor divided by the average duty cycle for each motor;
determine a total effective current based upon a sum of the effective current for each electric motor assembly in the multiple electric motor assemblies; and
determine the commanded current for each electric motor assembly in the multiple electric motor assemblies based upon a quotient of the effective current for each motor divided by the total effective current and multiplied by the total commanded current.

7. The aircraft of claim 1, wherein the aircraft is selected from one of:
an airplane;
a helicopter;
a rotorcraft;
a quadcopter; and
an unmanned aerial vehicle.

8. An aircraft that comprises:
a battery;
multiple electric motor assemblies connected to multiple propellers, each electric motor assembly of the multiple electric motor assemblies, respectively, comprises:
a voltage controller programmed to receive a commanded current from a commanded current calculator;
an operating state and a recharge state;
a power inverter that comprises only one inductor within the power inverter;
a motor connected to a propeller of the multiple propellers;
wherein the voltage controller comprises:
a first pair of switches connected to the battery;
a second pair of switches connected to battery;
a single diode connected to the inductor within the power inverter;
only one inductor within the voltage controller located between and connected to the first pair of switches and the second pair of switches and configured to store energy;
a switch, distinct from the first pair of switches and the second pair of switches, connected to the inductor within the power inverter and configured to:
direct current from the voltage controller to the power inverter responsive to the electric motor assembly being in the operating state and the switch connected to the inductor within the voltage controller being closed; and
direct current through the inductor within the voltage controller to the battery responsive to the electric motor assembly being in the recharge state and the switch connected to the inductor within the voltage controller being open;
only one capacitor that comprises a first terminal and a second terminal, the capacitor is configured to:
receive the energy from the one inductor within the voltage controller;
maintain a desired voltage; and
drive the power inverter with a current based upon a duty cycle of the first pair of switches and the second pair of switches to power each motor;
wherein the first terminal of the capacitor is connected to:
the single diode connected to the inductor within the power inverter;
a first switch of the first pair of switches; and wherein the second terminal of the capacitor is connected to:
a first switch of the second pair of switches; and
a series of switches within the power inverter.

9. The aircraft of claim 8, further comprising a controller programmed to, respectively for each of the multiple electric motor assemblies:
control the switch connected to the inductor within the power inverter and the capacitor in the voltage controller and thereby change, based upon a charge state received from the battery, each electric motor assembly between the operating state and the recharge state;
control a duty cycle for each switch in the first pair of switches and the second pair of switches within the voltage controller and thereby control current to the capacitor in the voltage controller;

change a direction of a torque of each electric motor assembly; and calculate a command current for each electric motor assembly based upon: the commanded current from a battery balancer circuit connected to the battery, a commanded voltage from the battery balancer circuit, an average duty cycle of each electric motor assembly, and an actual current output of each electric motor assembly.

10. The aircraft of claim 8, further comprising a controller programmed to identify a recharging parameter for each motor in response to an event when the aircraft is in a regenerative braking state.

11. The aircraft of claim 10, wherein the event is selected from one or more of:
the aircraft entering the regenerative braking state;
an expiration of a period of time; or
a change in each motor.

12. The aircraft of claim 8, wherein the aircraft is selected from one of:
an airplane;
a helicopter;
a rotorcraft;
a quadcopter; and
an unmanned aerial vehicle.

13. The aircraft of claim 8 further comprising:
a battery balancer circuit that is configured to use a battery charge state to determine a total commanded current for the multiple electric motor assemblies, wherein the total commanded current is determined by current needs of the battery;
a commanded current calculator programmed to determine a commanded current for each electric motor assembly in the multiple electric motor assemblies from the total commanded current, wherein the commanded current for each electric motor assembly in the multiple electric motor assemblies is proportional to a measured current of each electric motor assembly; and
a controller programmed to control the first pair of switches and the second pair of switches in each electric motor assembly in the multiple electric motor assemblies based upon the commanded current for each electric motor assembly to control a current provided from each electric motor assembly in the recharge state to the commanded current for each electric motor assembly.

14. The aircraft of claim 13, wherein the commanded current calculator is programmed to:
receive a measured current for each electric motor assembly in the multiple electric motor assemblies;
receive an average duty cycle for each electric motor assembly in the multiple electric motor assemblies;
determine an effective current for each electric motor assembly in the multiple electric motor assemblies based upon a quotient of the measured current for each electric motor assembly divided by the average duty cycle for each electric motor assembly;
determine a total effective current by adding together the effective current for each electric motor assembly in multiple electric motor assemblies; and
determine the commanded current for each electric motor assembly in multiple electric motor assemblies as the effective current for each electric motor assembly based upon an inverse of the total effective current and by the total commanded current.

15. A method for providing electric power to an aircraft powered by multiple electric motor assemblies powered by a source of electric power, the method comprising:
providing the multiple electric motor assemblies and the source of electric power to the aircraft;
connecting the source of electric power to a controller comprising a commanded current calculator connected to the multiple electric motor assemblies, wherein each electric motor assembly of the multiple electric motor assemblies, respectively comprises:
a recharge state and an operating state;
a power inverter comprising only one inductor within the power inverter;
a motor connected to the power inverter and to a propeller; and
a voltage controller comprising:
a switch bridge comprising:
a first pair of switches connected to the source of electric power; and
a second pair of switches connected to the source of electric power;
a single diode connected to the inductor within the power inverter;
only one inductor within the voltage controller located between and connected to the first pair of switches and the second pair of switches and configured to store energy;
a switch, distinct from the first pair of switches and the second pair of switches, connected to the inductor within the power inverter and configured to:
direct current from the voltage controller to the power inverter responsive to the electric motor assembly being in the operating state and the switch connected to the inductor within the voltage controller being closed; and
direct current through the inductor within the voltage controller to the source of electric power responsive to the electric motor assembly being in the recharge state and the switch connected to the inductor within the voltage controller being open;
only one capacitor comprising a first terminal and a second terminal, the capacitor being configured to:
receive the energy from the one inductor within the voltage controller;
maintain a desired voltage;
limit a voltage output from the voltage controller that recharges the source of electric power; and
drive the power inverter;
wherein the first terminal of the capacitor is connected to:
the single diode; and
a first switch of the first pair of switches; and
wherein the second terminal of the one capacitor is connected to:
a first switch of the second pair of switches; and
a series of switches within the power inverter;
operating each electric motor assembly of the multiple electric motor assemblies for propelling the aircraft during the operating state;
charging the source of electric power during the recharge state;
wherein the voltage controller receives a commanded current from the commanded current calculator;
wherein the capacitor performs the following operations:

receiving the energy from the inductor within the voltage controller;

maintaining the desired voltage; and driving, using a duty cycle of the first pair of switches and the second pair of switches, the power inverter for powering each motor;

wherein the switch connected to the inductor within the power inverter directing current from the voltage controller to the power inverter when the electric motor assembly is in the operating state and the switch connected to the inductor within the voltage controller is closed; and wherein the switch connected to the inductor within the power inverter directing current from the voltage controller to the source of electric power when the electric motor is in the recharge state; and controlling a voltage provided from the source of electric power to the switch bridge during the operating state;

controlling the switch bridge and a current provided to each motor during the operating state;

determining a battery charge state of the source of electric power;

determining, using the battery charge state, a commanded current and controlling, via controlling the switch bridge using the commanded current, a current provided from each motor during the recharge state to the commanded current;

determining, using the batty charge state, a commanded voltage, wherein the commanded voltage is determined by voltage needs of the battery;

wherein the one capacitor provides a voltage to the source of electric power during the recharge state and limits the voltage to the source of electric power to the commanded voltage; and wherein each motor provides electrical power to the source of electric power from mechanical power turning each motor during the recharge state.

16. The method of claim 15, further comprising the controller programmed to identify a recharging parameter selected from one of: a total current to the source of electric power, or a voltage for each electric motor assembly of the multiple electric motor assemblies.

17. The method of claim 15, further comprising the controller programmed to:

identify a recharging a recharging parameter in response to an event when the aircraft is in the recharge state, wherein the event is selected from at least one of:
the aircraft entering the recharging state,
an expiration of a period of time, or
a change within the multiple electric motor assemblies;

control the duty cycle for each switch in the first pair of switches and the second pair of switches within the voltage controller and thereby control current to the capacitor in the voltage controller;

change the direction of a torque of each electric motor assembly; and calculate a command current for each electric motor assembly based upon:
the commanded current from a battery balancer circuit,
the commanded voltage from the battery balancer circuit,
an average duty cycle of each electric motor assembly, and
an actual current output of each electric motor assembly.

18. The method of claim 15 further comprising:

propelling, via operating at least one propeller connected to a respective one of the each motor, the aircraft during the operating state and charging the source of electric power on the aircraft during the recharge state;

using the battery charge state to determine a total commanded current for each electric motor assembly of the multiple electric motor assemblies, wherein the total commanded current is determined by current needs of the source of electric power;

determining a commanded current for each electric motor assembly in the multiple electric motor assemblies from the total commanded current, wherein the commanded current for each electric motor assembly in the multiple electric motor assemblies is proportional to a measured current of each motor; and controlling the switch bridge for each electric motor assembly in the multiple electric motor assemblies using the commanded current for each motor to control the current provided from each electric motor assembly during the recharge state to the commanded current for each electric motor assembly.

19. The method of claim 18, wherein determining the commanded current for each electric motor assembly in the multiple electric motor assemblies comprises:

receiving a measured current for each electric motor assembly in the multiple electric motor assemblies;

receiving an average duty cycle for each electric motor in the multiple electric motor assemblies;

determining an effective current for each electric motor assembly in the multiple electric motor assemblies by dividing the measured current for each motor by the average duty cycle for each motor;

determining a total effective current by adding together the effective current for each electric motor assembly in the multiple electric motor assemblies; and determining the commanded current for each electric motor assembly in the multiple electric motor assemblies as the effective current for each motor divided by the total effective current and multiplied by the total commanded current.

20. The method of claim 15, further comprising recharging the source of electric power via landing the aircraft via a flight computer receiving commands and a relative wind turning the propeller.

* * * * *